United States Patent
Ayubi-Moak et al.

(10) Patent No.: US 10,528,684 B1
(45) Date of Patent: Jan. 7, 2020

(54) TCAD DESIGN TEMPLATE FOR FAST PROTOTYPING OF 2D AND 3D CMOS IMAGE SENSORS

(71) Applicant: Synopsys, Inc., Mountain View, CA (US)

(72) Inventors: Jason S. Ayubi-Moak, Chandler, AZ (US); Gergö A. Létay, Winterthur (CH); Lutz Schneider, Zurich (CH); Wei-Choon Ng, Sunnyvale, CA (US)

(73) Assignee: Synopsys, Inc., Mountain View, CA (US)

(*) Notice: Subject to any disclaimer, the term of this patent is extended or adjusted under 35 U.S.C. 154(b) by 0 days.

(21) Appl. No.: 16/206,062

(22) Filed: Nov. 30, 2018

Related U.S. Application Data

(60) Provisional application No. 62/594,260, filed on Dec. 4, 2017.

(51) Int. Cl.
*G06F 17/50* (2006.01)
*G06K 9/00* (2006.01)

(52) U.S. Cl.
CPC ...... *G06F 17/5009* (2013.01); *G06F 17/5068* (2013.01); *G06F 2217/02* (2013.01); *G06F 2217/06* (2013.01)

(58) Field of Classification Search
CPC ............. G06F 17/5009; G06F 17/5068; G06F 2217/02; G06F 2217/04; G06F 2217/06; G06K 9/00
(Continued)

(56) References Cited

U.S. PATENT DOCUMENTS 5,953,448 A * 9/1999 Liang ............... G01B 11/24
356/613
7,295,706 B2 * 11/2007 Wentland ............ G01V 11/00
382/181

(Continued)

OTHER PUBLICATIONS

Li, Z.M. Simon, et al, article entitled "TCAD Simulation of CMOS Image Sensor", Crosslight Software Inc., Vancouver BC, Canada, 24 pages, date unkonwn.
(Continued)

*Primary Examiner* — Phallaka Kik
(74) *Attorney, Agent, or Firm* — Bever, Hoffman & Harms, LLP

(57) ABSTRACT

An improved TCAD software tool includes a structure generator for generating a core single-pixel three-dimensional (3D) model including only front-end details of a single CIS pixel, a prototyping tool for generating modified CIS prototypes by automatically combining the core single-pixel 3D model with features and configurations included in selected modular templates, and a separate mesh generator for generating optical simulation models by generating optical meshes based on each CIS prototype's selected configuration. The modular templates include pre-configured optically-relevant (e.g., micro-lens and anti-reflection) structures, alternative (e.g., front-side illuminated or back-side illuminated, two-dimensional or 3D) pixel configurations, alternative array configurations, and alternative color filter patterns. Optical simulation results generated for the various prototypes displayed for analysis using a movie process and using curves having colors that correspond to associated simulated visible light frequencies.

20 Claims, 14 Drawing Sheets

(58) Field of Classification Search
USPC ......... 716/139, 54, 55; 382/144, 154; 703/2, 703/6, 13
See application file for complete search history.

(56) References Cited

U.S. PATENT DOCUMENTS

| | | | |
|---|---|---|---|
| 8,253,778 B2* | 8/2012 | Atsushi | A61C 1/084 348/42 |
| 9,728,565 B2 | 8/2017 | Fossum et al. | |
| 9,985,786 B1* | 5/2018 | Bhabbur | G09C 5/00 |
| 2007/0192389 A1* | 8/2007 | Chang | G06F 7/582 708/250 |
| 2011/0102549 A1* | 5/2011 | Takahashi | A61C 1/084 348/46 |
| 2012/0300985 A1* | 11/2012 | Ito | G06F 21/32 382/103 |
| 2014/0354548 A1* | 12/2014 | Lee | G06F 3/0346 345/166 |
| 2015/0054946 A1* | 2/2015 | Zhang | G01B 11/25 348/136 |
| 2015/0084951 A1* | 3/2015 | Boivin | H04N 13/275 345/419 |
| 2016/0049536 A1 | 2/2016 | Kim et al. | |
| 2018/0090537 A1 | 3/2018 | Ma et al. | |

OTHER PUBLICATIONS

Ma, Jiaju et al., article entitled "TCAD Modeling of Devices for Quanta image Sensors", Thayer School of Engineering at Dartmouth, Apr. 1, 2015, 25 pages.

Crocherie, Axel et a., article entitled "From photons to electrons: a complete 3D simulation flow for CMOS image sensor", IEEE 2009 Int'l. Image Sensor Workshop (IISW), 4 pages.

Essa, Z., et al., article entitled "3D TCAD Simulation of Advanced CMOS Image Sensors", IEEE 2011, 4 pages.

* cited by examiner

| | CORE SINGLE-PIXEL 3D MODEL 119 | | | |
|---|---|---|---|---|
| NAME | X-Y BOUNDARIES | X-Z BOUNDARIES | Y-Z BOUNDARIES | MATERIAL/ DOPING |
| ⋮ | ⋮ | ⋮ | ⋮ | ⋮ |
| PD | P0,P1 | P2,P3 | P4,P5 | Si/2 |
| ⋮ | ⋮ | ⋮ | ⋮ | ⋮ |

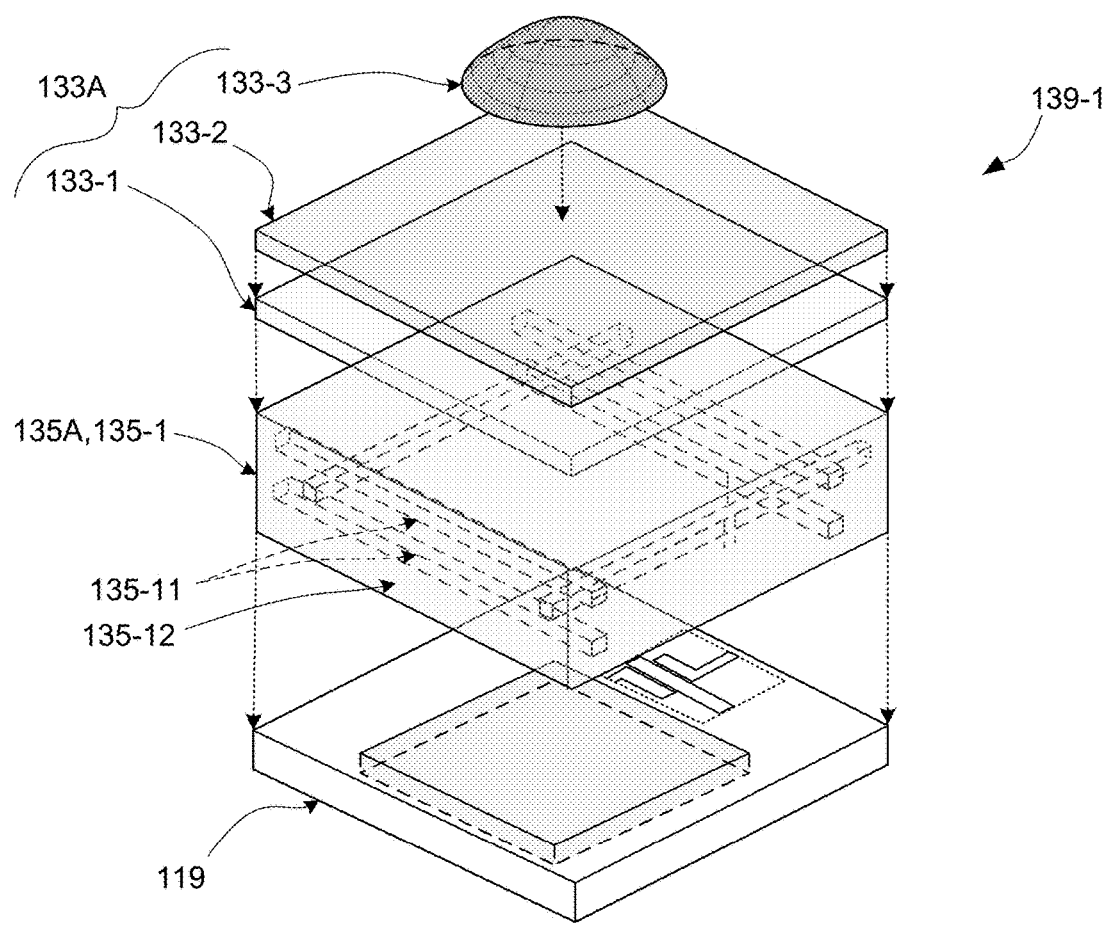
FIG. 5A
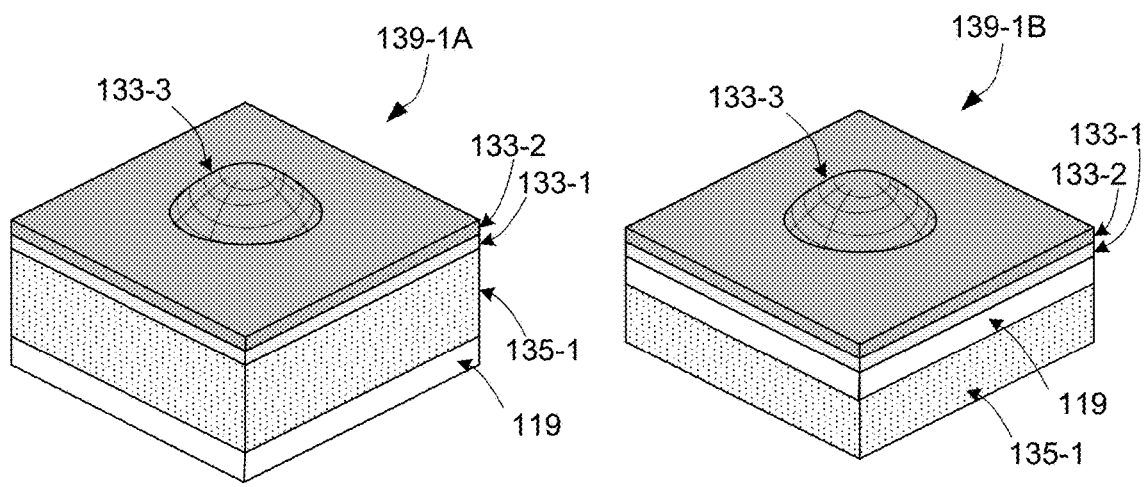
FIG. 5B   FIG. 5C

TCAD DESIGN TEMPLATE FOR FAST PROTOTYPING OF 2D AND 3D CMOS IMAGE SENSORS

RELATED APPLICATIONS

This application claims priority from U.S. Provisional Patent Application 62/594,260, entitled "TCAD DESIGN TEMPLATE FOR FAST-PROTOTYPING OF 2D AND 3D CMOS IMAGE SENSORS", which was filed on Dec. 4, 2017, and is incorporated by reference herein.

FIELD OF THE INVENTION

The present disclosure generally relates to electronic design automation (EDA) software tools, and more specifically to Technology Computer-Aided Design (TCAD) software tools.

BACKGROUND OF THE INVENTION

As circuits have become more complex, electronic design automation (EDA) software tools have been developed to facilitate designing, testing and modifying circuit designs in preparation for manufacturing (i.e., fabricating or otherwise producing) physical circuit structures that are based on final versions of the circuit designs. As used herein, the term "circuit" generally refer to integrated circuit (IC) devices that are fabricated on semiconductor substrates using CMOS fabrication techniques, and the term "circuit design" refers to a software-based description of a corresponding circuit at a system level, sub-system level, or even at a transistor level. EDA software tools typically include resources (e.g., standard-cell libraries) and design assembly software that allow circuit designers to efficiently arrange and interconnect the various functional sections (blocks) of their circuit designs in the form of software-based circuit descriptions, various testing resources that allow the circuit designers to test and modify their circuit designs during development, and various conversion tools that facilitate the generation of layout files (i.e., software files that include all masks and fabrication process steps, such as diffusion and ion implantation, required to fabricate an associated circuit design using a selected fabrication process, such as CMOS), thereby facilitating subsequent fabrication of physical circuits based on the final circuit designs. Because modern circuits (e.g., System-on-Chip devices) can include billions of transistors and other circuit elements, EDA tools have become essential in the development and testing of modern circuit designs. That is, without EDA software tools, generating a modern circuit from concept to physical circuit using manual design techniques would be practically impossible.

Technology Computer-Aided Design (TCAD) software tools are a type of EDA software tool that allow circuit designers to model (i.e., virtually fabricate) the physical configuration and related device properties of a circuit design, and then simulate operation of the model in response to various environmental conditions before actual fabrication of an physical device (chip) including circuitry that implements the new circuit design. Modelling generally involves utilizing a layout (technology) file and design rules to generate a virtual three-dimensional (3D) physics-based model including all structures and doped semiconductor regions that would be produced physically if the layout file was followed during the selected fabrication process. Simulation and characterization involve virtually testing the physical structures forming the 3D model using a variety of conditions (e.g., various applied voltages and operating temperatures) to determine performance, yield and reliability of the circuit design (i.e., as described by the layout file). TCAD tools are therefore distinguished from other EDA verification tools in that they consider the physical configuration and related device properties of a circuit design.

In addition to simulating and testing electrical (device) characteristics, modern TCAD software tools also facilitate optical simulation of opto-electric elements, such as diodes and image sensors. The optical simulation of an image sensor design using a current commercially available (conventional) TCAD software tool typically begins when a user submits a layout file (aka, recipe card) that includes all process details (e.g., process-emulation commands, mask designs, doping profiles and critical dimension details) needed to fabricate a physical image sensor device based on the image sensor design. Known techniques are utilized to virtually fabricate a 3D model of the image sensor based on the layout file, then modify the 3D model (or a 2D model including a cross-section of the 3D model) to include optical mesh information that describes optical characteristics at each point within the 2D/3D model, and then perform optical simulation to test (characterize) the response of their image circuit designs to applied electro-magnetic radiation at various frequencies. Accordingly, by using a modern TCAD tool, such as Sentaurus TCAD produced by Synopsys, Inc. of Mountain View, Calif., USA, CMOS (and other) image sensor designers are able to virtually construct, simulate and characterize new image sensor designs in a cost-effective manner before actual fabrication of physical test devices in a foundry, thereby substantially reducing both development costs and development time in comparison to foundry-only development techniques.

Although conventional TCAD tools substantially reduce image sensor development cost/time, they require image sensor designers to generate a separate layout file that completely describes each CMOS image sensor (CIS) pixel configuration submitted for simulation. That is, in addition to generating a layout file including a front-end design (i.e., photodiode and control transistors formed in and on a semiconductor substrate), designers must also include in the layout file processing details related to all back-end structures (e.g., metal wiring) and all optically-relevant structures (e.g., color filter layers and micro-lenses). This task is even more time consuming when a designer wishes to compare the characteristics of CIS pixel designs having slightly different configurations because the designer must generate and submit a new layout file for each minor difference. For example, if a designer wished to compare a back-side illuminated (BSI) version of a particular CIS pixel design with a front-side illuminated (FSI) version of the CIS pixel design, the designer would be required to generate and submit a first layout file including a description of the BSI version and a second layout file including a description of the FSI version. Similarly, if a designer wished to slightly change other aspects of a pixel configuration (e.g., to move a micro-lens position, or to add an anti-reflective layer), the designer would have to generate and submit a separate layout file for each different CIS pixel design configuration. As such, is typically very time-consuming for CIS pixel designers to utilize conventional TCAD tools during development of a CIS pixel due to the significant effort required to specify all mask features and process parameters for each different CIS pixel/array configuration, which can lead to development delays, lost revenue, and can limit a designer's creativity and innovation.

In addition to the burden placed on designers, the required submission of separate layout files for each different CIS pixel/array configuration greatly increases the computer processing time required to develop CIS image sensors using conventional TCAD software tools. That is, conventional TCAD software tools perform a complete structural generation (i.e., virtual fabrication) process and a complete mesh generation process for each submitted layout file, even when two sequentially submitted layout files include similar CIS pixel/array configurations. For example, in the above-mentioned case of similar BSI and FSI CIS pixel design versions (i.e., where front-side and metal interconnect structures are essentially identical in each version), conventional TCAD software tools perform substantially identical structural/mesh generation processes twice with respect to the substantially identical structures (i.e., virtual fabrication of front-side and metal interconnect structures is performed a first time when the first layout file including the BSI version is submitted, and then performed a second time when the second layout file including the BSI version is submitted). This practice of processing each submitted layout file "from scratch" produces an inherent inefficiency in that the computer processor executing the TCAD software tool is required to virtually fabricate and generate optical meshes for substantially identical structures. This processing inefficiently is compounded (i.e., made worse) when a designer wishes to compare performance of groups of pixels that utilize different color filter schemes because structure generation must be performed "from scratch" for each group of pixels.

What is needed is an improved TCAD tool and associated method for performing optical simulation and characterization that facilitates efficient image sensor prototyping by way of allowing a designer to avoid the inefficiencies associated with conventional tools/methods during the development of CIS pixel designs.

SUMMARY OF THE INVENTION

The present invention is directed to an improved TCAD software tool and associated method that facilitates efficient CIS image sensor prototype generation by way of allowing a designer to modify a core single--pixel 3D model using standardized optically relevant (and other) design features that can be selectively combined within the TCAD software tool, thereby enabling the designer to quickly generate multiple simulation models using a single core single-pixel 3D model. The improved TCAD software tool generates (virtually fabricates) the core single-pixel 3D model based on the designer's submitted layout file, which provides processing information related to the front-end portion of a single image sensor pixel (i.e., only one layout file is required). Selective modification of the core single-pixel 3D model is then performed using operational controls integrated into the TCAD software tool that facilitate combining or reconfiguring the core single-pixel 3D model according to one or more modular templates selected from a corresponding library (e.g., such that the modified pixel model includes selected 3D optically-relevant structure designs, such as color filter layers and/or micro-lens structures, that are provided in the selected modular templates). By facilitating modification of a core single-pixel 3D model in this manner, the present invention facilitates rapid generation of multiple different modified 3D models, with each 3D model including the core single-pixel 3D model and additional 3D structure designs in a selected configuration based on details provided by the associated selected modular templates, thereby obviating the time-consuming process of generating a complete pixel/array model for each separate pixel/array configuration before submission to the TCAD software tool, as required by conventional approaches. Moreover, the improved TCAD tool of the present invention reduces computer processing time by way of performing virtual fabrication of the core single-pixel 3D model only once (i.e., upon submission of the corresponding layout file), and facilitating the use of the core single-pixel 3D model to generate multiple simulation models by way of providing the structural features of the modular templates in a form that can be efficiently combined with the core single-pixel 3D model (i.e., without requiring additional virtual fabrication processing). Accordingly, the improved TCAD software tool and associated method of the present invention provide more efficient (faster) parameterization of different pixel configurations, and also facilitates superior troubleshooting using less computer processing time than that required to implement conventional TCAD approaches, thereby promoting accelerated product development.

According to an aspect of the invention, the improved TCAD software tool/method separates functions performed during virtually fabrication of the core single-pixel 3D model (i.e., operations performed by a structure generation toolstep) from functions performed to generate an optical mesh (i.e., operations performed by a separate mesh generation toolstep), and facilitates modification of the core single-pixel 3D model using selected modular templates by providing a prototyping toolstep that is executed between the structure generation toolstep and the mesh generation toolstep. This approach differs from convention TCAD software tools that sequentially perform structure generation and mesh generation on a submitted layout file as part of a single process, which significantly complicates modification of the modeled pixel structure prior to simulation. The structure generation toolstep generates the core single-pixel 3D model using known structure generation techniques based on processing details provided in the single pixel layout file (e.g., one or more of process-emulation commands, defined masks, doping profile information and critical dimensions). In one embodiment, the structure generation toolstep automatically assigns index-tagged names to every region and contact of the core single-pixel 3D model based on corresponding names provided in the layout file, thereby making it easy for the designer to quickly identify and access any region/contact to set up a subsequent optical (or device) simulation. After the core single-pixel 3D model is generated, the improved TCAD software tool utilizes the prototyping toolstep to facilitate the optional generation of one or more single-pixel 2D models by allowing the designer to define a cross-section (2D cut) of the modified single-pixel 3D model, and the optional generation of array (multi-pixel) models by way of replicating the modified single-pixel 2D or 3D models. The discrete mesh generation toolstep is then implemented to generate a simulation model for each modified 2D/3D pixel/array model by way of efficiently generating an associated 2D or 3D optical mesh and optional mixed-element mesh for each modified 2D/3D pixel/array model. A simulation toolstep is then utilized (e.g., using known techniques) to perform optical simulation on each simulation model, and the simulation results are generated for use by the designer, e.g., to modify associated portions of the circuit design. By utilizing the prototyping toolstep between discrete structure generation and mesh generation toolsteps, the improved TOAD software tool/method facilitates the efficient generation of multiple simulation models using substantially less computer processing time than is required by conventional TCAD software tools that require separate layout files for each simulation model.

As set forth above, the prototyping toolstep is configured to allow a designer to select one or more pre-defined pixel configurations and structural features from one or more associated template libraries for combination with the core single-pixel 3D model. In one embodiment, the prototyping toolstep includes a 3D pixel generation process including an optical component generator, a back-end structure generator and a pixel configuration generator that facilitate modification of the core single-pixel 3D model using various optional design features and pixel configurations based on corresponding modular templates. For example, the optical component generator allows selection of anti-reflective layers, color filter layers and micro-lens structures from a first template library, and the back-end structure generator allows selection of various standard back-end structure designs from a second template library. The pixel configuration generator facilitates the efficient configuration of the core single-pixel 3D model and the selected optically relevant and back-end designs in one or both of a frontside-illuminated (FSI) configuration and a backside-illuminated (BSI) configuration by way of allowing the user/designer to "share" structural descriptions (i.e., to duplicate and rearrange the core single-pixel 3D model and the selected optically relevant and back-end designs), thereby reducing computer processing time by avoiding the need to perform structural generation for each different (e.g., FSI and BSI) model versions formed from at least one common structure. In one embodiment, the prototyping toolstep provides an optional two-dimensional (2D) model generation process configured to generate single-pixel 2D models defined by user-designated cross-sectional "cuts" of selected modified single-pixel 3D models. In another embodiment, the prototyping toolstep provides an optional array model generation process that allows the designer to, for example, selectively combine multiple replicas of a modified single-pixel 3D model or a single-pixel 2D model in a selected pixel arrangement (e.g., square or linear) to form 2D or 3D array models of any size, and to implement a selected color filter arrangement as configured in a selected modular color filter template in order to generate a multiple-pixel array structure model. The formation of 2D and 3D arrays using replicated 2D and 3D single-pixel models greatly reduces amount of time required for a designer/user to generate a corresponding array for submission to a TCAD tool using conventional approaches, and greatly reduces computer processing time during operation of the TCAD tool by minimizing structural generation processing to only one pixel (i.e., the conventional techniques require structural generation processing of the entire submitted array design).

The mesh generation toolstep is utilized to generate simulation models by generating optical mesh information for each structure of the modified 2D/3D pixel/array model(s) received from the prototyping toolstep. To minimize processing time, the mesh generation toolstep determines the 2D or 3D configuration of each received modified model, and generates 2D or 3D tensor (optical) mesh information accordingly. For example, when a 3D single-pixel model or a 3D array model is received, the mesh generation toolstep generates 3D tensor mesh information (e.g., in the form of cubic-type tensor mesh elements) for each structure/region of 3D pixel/array model. Conversely, when a 2D single-pixel model or a 2D array model is received, the mesh generation toolstep generates 2D tensor mesh information (e.g., in the form of rectangular-type tensor mesh elements) for each structure/region of 2D pixel/array model.

According to a practical embodiment, the TCAD software tool of the present invention is implemented as part of a host EDA software tool that is configured to execute the modeling, simulation and characterization processes described herein when operably loaded and executed by a processor in a computer. In an alternative practical embodiment, the TCAD software tool/method is implemented as part of an electronic structure (e.g., a computer or system) that is programmed to execute the host EDA software tool. As set forth above, when operably loaded and executed by a processor in a computer, the TCAD software tool performs the above-mentioned modeling, optical simulation and characterization method on a target image sensor pixel design during or at the end of the design phase of a host IC design that includes the target image sensor pixel, whereby the characterization results may be utilized to optimize a final image sensor pixel design (i.e., update/change the target image sensor pixel design) prior to fabrication of the host IC device. Although the exemplary embodiments provided herein are directed to optical and electrical simulation of CMOS image sensors, the present invention is also applicable to other image sensor technologies where it is necessary to build and characterize a periodic array of similar components (e.g., photodetectors, sensors, photonic crystals, etc.), and the improved TCAD software tool may be configured to perform other simulation types, such as electrical or thermal simulation.

BRIEF DESCRIPTION OF THE DRAWINGS

These and other features, aspects and advantages of the present invention will become better understood with regard to the following description, appended claims, and accompanying drawings, where:

FIG. 5A is an exploded perspective view depicting portions of a modified single-pixel 3D model according to an exemplary embodiment of the present invention;

FIGS. 5B and 5C are perspective views showing the modified single-pixel 3D model portions of FIG. 5A assembled in alterative FSI and BSI configuration;

DETAILED DESCRIPTION OF THE DRAWINGS

The present invention relates to an improved TCAD software tool (TCAD tool) and associated methods for use during the development of circuit designs that include CMOS image sensors (CISs), where the circuit designs are software-based descriptions utilized in the fabrication of physical IC devices that are based on the circuit designs. The Figures and the following Detailed Description signify innovations, embodiments and/or examples by way of illustration only, with various features, structures or characteristics described together in a single embodiment to streamline the disclosure. Variations of any of the elements, processes, machines, systems, manufactures or compositions disclosed by such exemplary innovations, embodiments and/or examples will be readily recognized and may be used in commerce without departing from the principles of what is claimed. The Figures and Detailed Description may also signify, implicitly or explicitly, advantages and improvements of a subset of the exemplary embodiments described herein.

In the Figures and Detailed Description, numerous specific details may be described to provide a thorough understanding of one or more of the exemplary embodiments. In the interest of not obscuring the presentation of embodiments of the claimed inventions, in the following Detailed Description, some processing steps or operations that are known in the art may have been combined together for presentation and for illustration purposes and in some instances may have not been described in detail. However, a person skilled in the art will recognize that these embodiments may be used in commerce without these specific details or with equivalents thereof. In other instances, well-known processes and devices are not described in detail as not to unnecessarily obscure aspects of these embodiments. In other instances, some processing steps or operations that are known in the art may not be described at all. The following description is instead focused on the distinctive features or elements of various embodiments of the claimed inventions. Furthermore, while this description may refer to some components of the structure in the singular tense, more than one component may be depicted throughout the figures and like components are labeled with like numerals.

Figure 1:
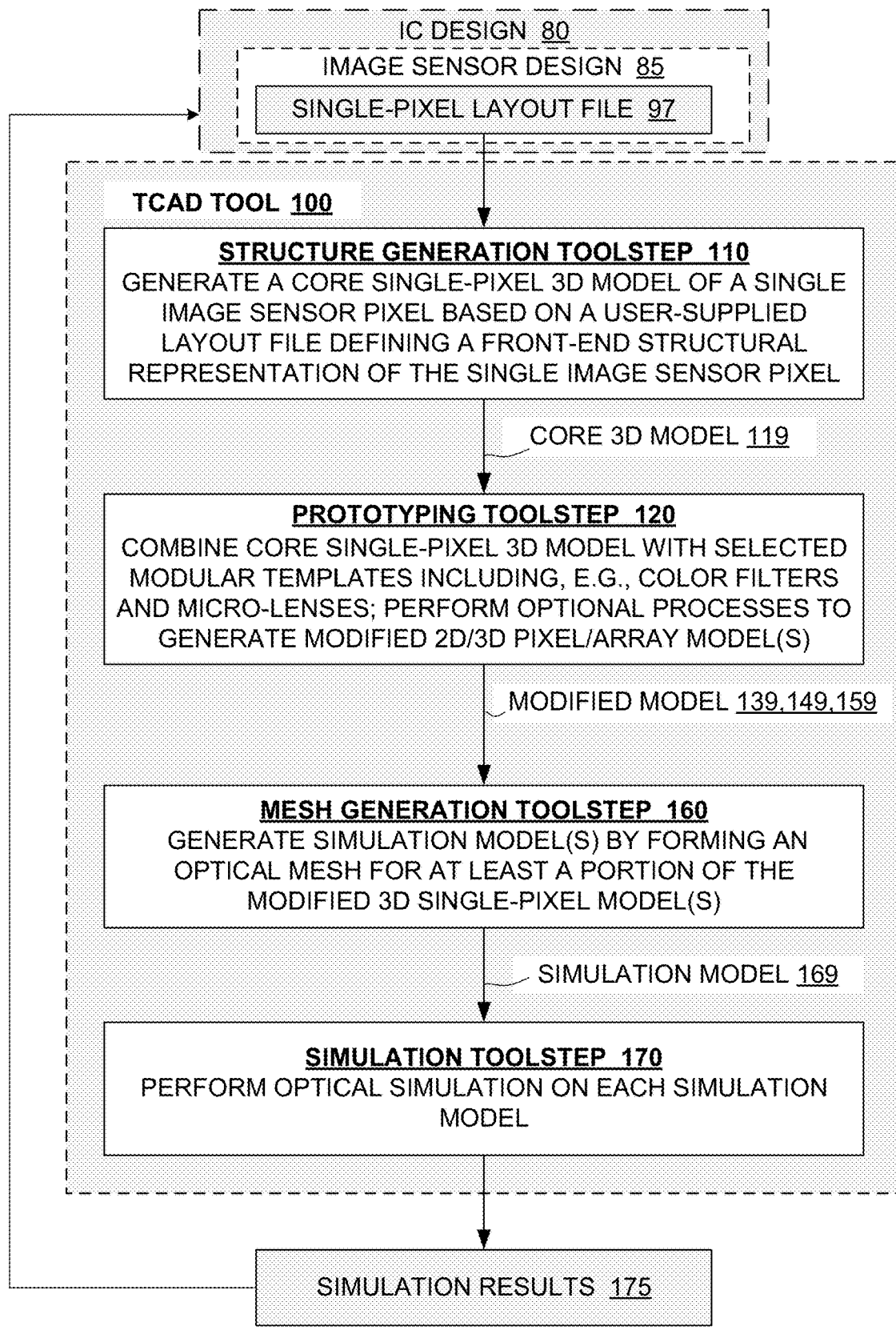
FIG. 1 is a flow diagram that depicts a method for performing optical and electrical simulation and characterization of an image sensor design using a TCAD software tool according to a generalized embodiment of the present invention.

FIG. 1 is a flow diagram that functionally depicts a TCAD software tool (TCAD tool) 100 and an associated method performed by TCAD tool 100 according to a generalized embodiment of the present invention. TCAD tool 100 is configured for use during the development of IC (circuit) designs 80 that include CMOS image sensor designs 85. For brevity, novel aspects of TCAD tool 100 are described below with reference to the modeling and optical simulation of selected portions of CMOS image sensor design 85 using the single-pixel structure operably described in a single-pixel layout file 97. That is, in the exemplary embodiments set forth below, TCAD tool 100 receives a single-pixel layout file 97 along with other control information input by a user/designer (as discussed below), and is configured to generate optical and/or device simulation results 175 suitable for optimizing and verifying the operation of CMOS image sensor 85 during development of circuit design 80 for subsequent fabrication of an associated integrated circuit device based on a final version of circuit design 80. TCAD tool 100 is not intended to be limited to the novel aspects described herein. For example, in one embodiment TCAD tool 100 is also operably configured to receive and process layout files including full pixel structures or multiple pixel sections of CMOS image sensor design 85 according to known techniques. In addition, although described with particular reference to optical simulation, TCAD tool 100 is also configured to perform device simulation.

As described below, TCAD tool 100 utilizes a series of "toolsteps", which are defined herein as discrete software tools (software programs or products) that are separately called and executed during the operation of TCAD tool 100 in the sequence set forth below. These toolsteps collectively simplify the task of generating and optically simulating 2D or 3D models suitable by way of facilitating the use of modular templates, where the term "template" is defined herein as a software-based data file configured such that, when encountered by a standard TCAD software tool, is interpreted as comprising one or more structures that occupy specified volumes and have associated relevant optical and electrical qualities (i.e., each template includes a corresponding software script that instructs TCAD tool 100 how to operate and what to do). As set forth below, the use of these modular templates significantly reduces the time required to generate models for optical simulation by allowing a designer to easily generate different image sensor configurations (i.e., by way of exchanging an applied template with different template), thereby facilitating quick re-configuration of a pixel design and side-by-side comparison in the same simulation/project flow with very little effort. In the preferred embodiment, the instructions performed by the various toolsteps of TCAD tool 100, which are described generally below with reference to FIG. 1, and described in further detail with reference to other figures, are implemented using a suitable software language (e.g., Scheme and/or Tool Command Language (TCL)) configured such that, when executed by a computer's processor, cause the processor to automatically generate simulation results having the characteristics described herein.

Referring to FIG. 1, TCAD tool 100 generally includes a structure generation toolstep 110, a prototyping toolstep 120, a mesh generation toolstep 160 and a simulation toolstep 170. Structure generation toolstep 110 is configured to receive single-pixel layout file 97, which includes a front-end portion of a single pixel of image sensor design 85 as described below with reference to FIG. 2. Structure generation toolstep 110 is configured to generate (i.e., virtually fabricate) a core single-pixel 3D model 119 using known techniques based on details supplied in layout file 97. Prototyping toolstep 120 is configured to allow a designer to selectively modify core single-pixel 3D model 119 using one or more modular templates selected from an associated library (or libraries) in order to generate one or more modified (complete) single-pixel 3D models 139 that the designer wishes to simulate and analyze. As described below with reference to FIGS. 4 to 8A, in one embodiment the prototyping toolstep 120 also allows the designer to generate two-dimensional (2D) single-pixel models 149, and/or to combine multiple replicas of modified single-pixel 2D or 3D models to form multiple-pixel 2D or 3D array models 159, and to optionally implement a selected modular color filter configuration on each array model. As described below with reference to FIGS. 9-14, mesh generation toolstep 160 is then used to generate one or more simulation models 169 by way of generating tensor (optical) mesh information for each structure of each modified pixel/array 2D/3D model 139, 149 and 159 that is received from prototyping toolstep 120. Simulation toolstep 170 then performs optical simulation and optional device simulation for each simulation model 169 using known techniques to provide simulation results 175, which include characterizations that may be utilized by a user/designer to improve IC design 80.

Figure 2:
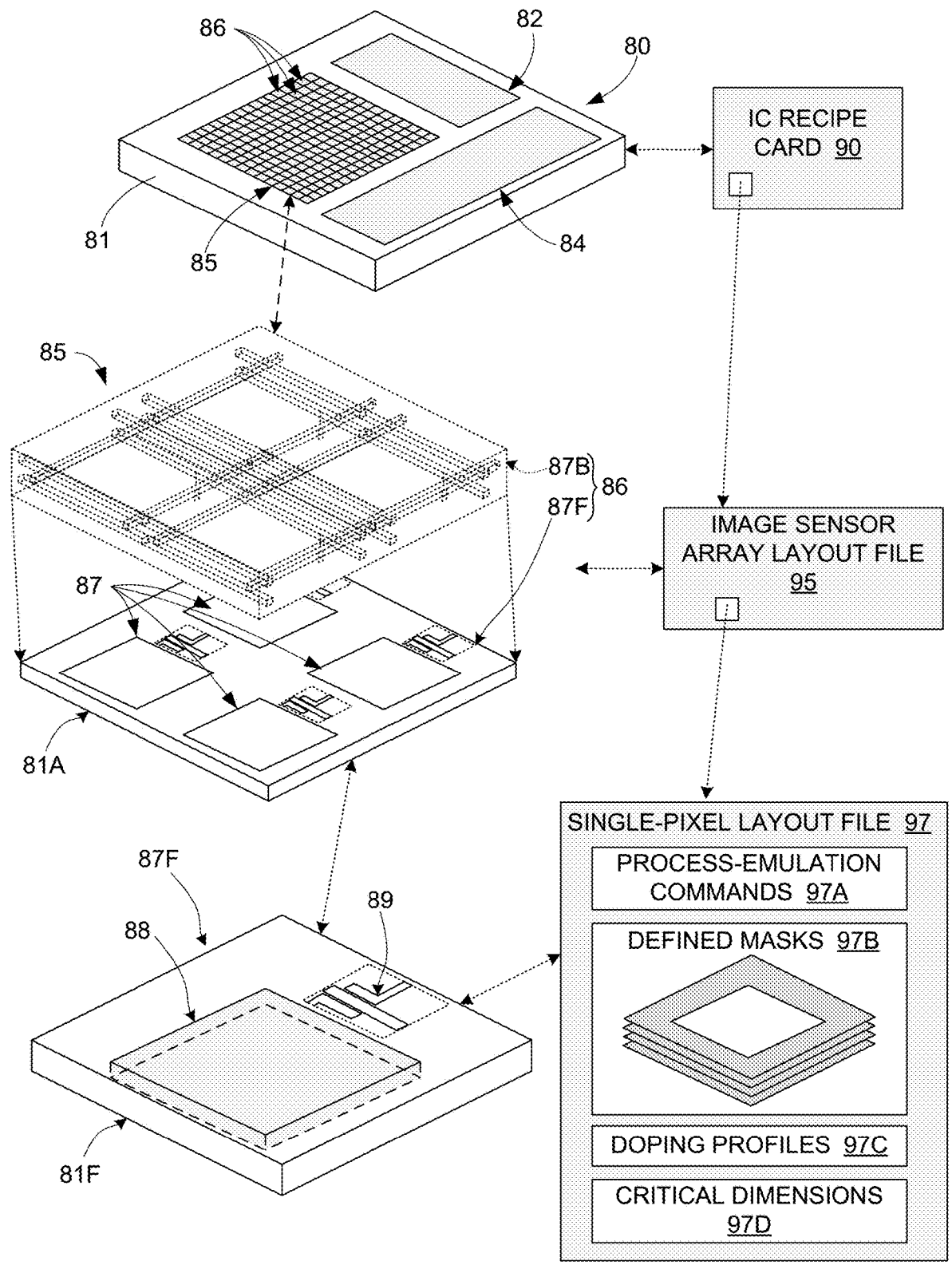
FIG. 2 is an exploded view diagram depicting the composition of a single-pixel layout file submitted to the TCAD software tool of FIG. 1.

FIG. 2 is a diagram that graphically illustrates the content of single-pixel layout file 97 in the context of host circuit design 80. Circuit design 80 is intended to represent a generic IC design that includes an image sensor array design 85, and is depicted with exemplary circuitry including a control circuitry design 82 and a functional circuitry design 84 that interact with image sensor array design 85 in a known manner. Depicted to the right of circuit design 80 is an IC recipe card 90, which stores process-emulation commands, mask designs, doping profiles and critical dimension details that are required to fabricate circuit design 80 on and over a semiconductor substrate 81 using a selected CMOS fabrication process node. That is, IC recipe card 90 that provides all process details needed to fabricate the circuitry of host circuit design 80. Depicted below circuit design 80 is a portion of image sensor design 85 including four image sensor pixel designs 86 that are graphically depicted as being disposed on a corresponding portion 81A of substrate 81. Image sensor pixel designs 86 may include a front-end portion 87F that describes all doped regions and front-end components (e.g., transistors, capacitors) utilized by image sensor design 85, and a back-end portion 87B that describes metal and interconnect layers utilized to transmit signals between pixels 86 and control circuitry 82. Image sensor array layout file 95, which is depicted to the right of image sensor array 85 in FIG. 2, represents a corresponding portion of IC recipe card 90 that includes process details associated with the fabrication of image sensor array 85. Depicted at the lower left portion of FIG. 2 is an exemplary front-end portion 87F of an exemplary single image sensor pixel 86, which includes a photodiode region 88 and control circuitry 89 formed on a corresponding region 81F of substrate 81. Single-pixel layout file 97, which is depicted to the right of front-end portion 87F, represents a corresponding portion of array layout card 95 that includes process details associated with the fabrication of front-end portion 87F. In one embodiment, single-pixel layout file 97 is at least partially stored using a standard (e.g., Graphic Database System (GDS), GDSII or OASIS) file format and generated using a commercially available layout editor (e.g., ICWBEV+ produced by Synopsys, Inc.), and also includes all process-related information (e.g., process-emulation commands 97A, defined masks 97B, doping profiles 97C and critical dimensions 97D) that is required for producing front-end portion 87F of a single pixel 86. That is, although the phrase "layout file" may denote layout (mask) information, as used herein single-pixel layout file 97 includes both layout information and all other process-related information required by a TCAD software tool to model (virtually fabricate) the physical configuration and related device properties of front-end portion 87F.

The various toolsteps of TCAD tool 100 (FIG. 1) will now be described in additional detail with reference to specific embodiments illustrated in FIGS. 3A to 14B. These specific embodiments are intended to illustrate various optional features that are not intended to be limiting unless specified in the appended claims.

Figures 3A, 3B:
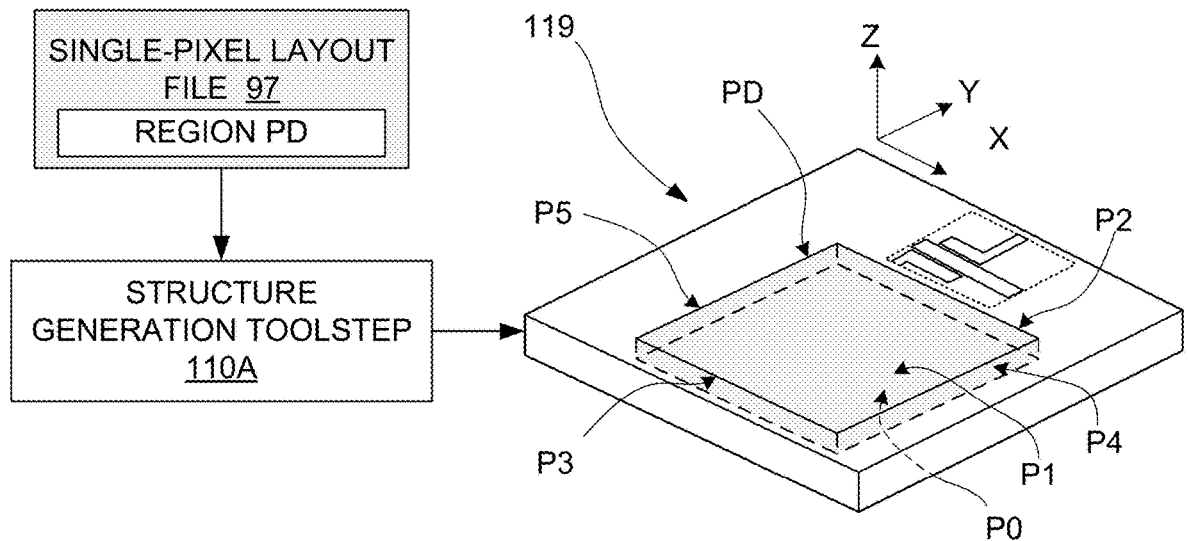
FIG. 3A is a flow diagram depicting the generation of a core single-pixel 3D model by a structure generation toolstep of the TCAD software tool of FIG. 1 according to a simplified exemplary embodiment.
FIG. 3B is a table including name and other information associated with a photodiode region of the core single-pixel 3D model of FIG. 3A.

FIG. 3A depicts the generation of core single-pixel 3D model 119 by structure generation toolstep 110A based on process-related information (details) supplied in a user-supplied single-pixel layout file 97. As explained above, the process-related information provided in layout file 97 includes process-emulation commands 97A, defined masks 97B, doping profile information 97C and critical dimensions 97D (see FIG. 2), and at least some of this information is utilized by structure generation toolstep 110A to generate core single-pixel 3D model 119. In a specific embodiment, the structure generation process includes loading layout file 97, defining highlight, saving/loading a TCAD markup file, creating masks from defined masks 97B (see FIG. 2), building 3D pixel model using process-emulation commands 97A (see FIG. 2), creating contacts using GDS text labels provided with layout file 97, and then saving the resulting single-pixel 3D model 119 using a suitable format (e.g., bnd.tdr). In other embodiments structure generation toolsteps may utilize other process information (i.e., other than that described above with reference to FIG. 2) that may be used to define various types of image sensor designs, or variants of particular designs.

FIG. 3B is a simplified exemplary partial table 319 listing all contacts and regions that are virtually generated in accordance with the process-related information provided with layout file 97, and collectively form core single-pixel 3D model 119. For example, table 319 includes an entry for photodiode region PD of core single-pixel 3D model 119 (see FIG. 3A). In one embodiment, structure generation toolstep 110A is configured to generate table 319 in a suitable text (i.e., a spreadsheet) format that facilitates access to useful information (e.g., composition and the location of boundaries) regarding the various regions and contacts during TCAD operations. For example, table 319 includes information regarding the substrate region (volume) occupied by photodiode PD as defined by horizontal X-Y boundary planes P0 and P1, vertical X-Z planes P2 and P3, and vertical Y-Z boundary planes P4 and P5, where the coordinate information needed to define each boundary plane is stored using known techniques. In one embodiment, structure generation toolstep 110A is configured to automatically assign names of all regions and contacts of core single-pixel 3D model 119 based on associated user-assigned names provided in single-pixel layout file 97. The automatic assignment of names in table 319 allows a sensor designer/user to specify selected names for all regions and contacts in layout file 97, and to easily identify corresponding region/contact information during TCAD operations. This functionality also simplifies the overall structure generation and contact definition process associated with the generation of single-pixel 3D model 119, which serves to reduce overall processing time.

Referring briefly to FIG. 1, after being generated by structure generation toolstep 110, core single-pixel 3D model 119 is passed to prototyping toolstep 120 for generation of one or more modified single-pixel 3D models 139.

Figure 4:
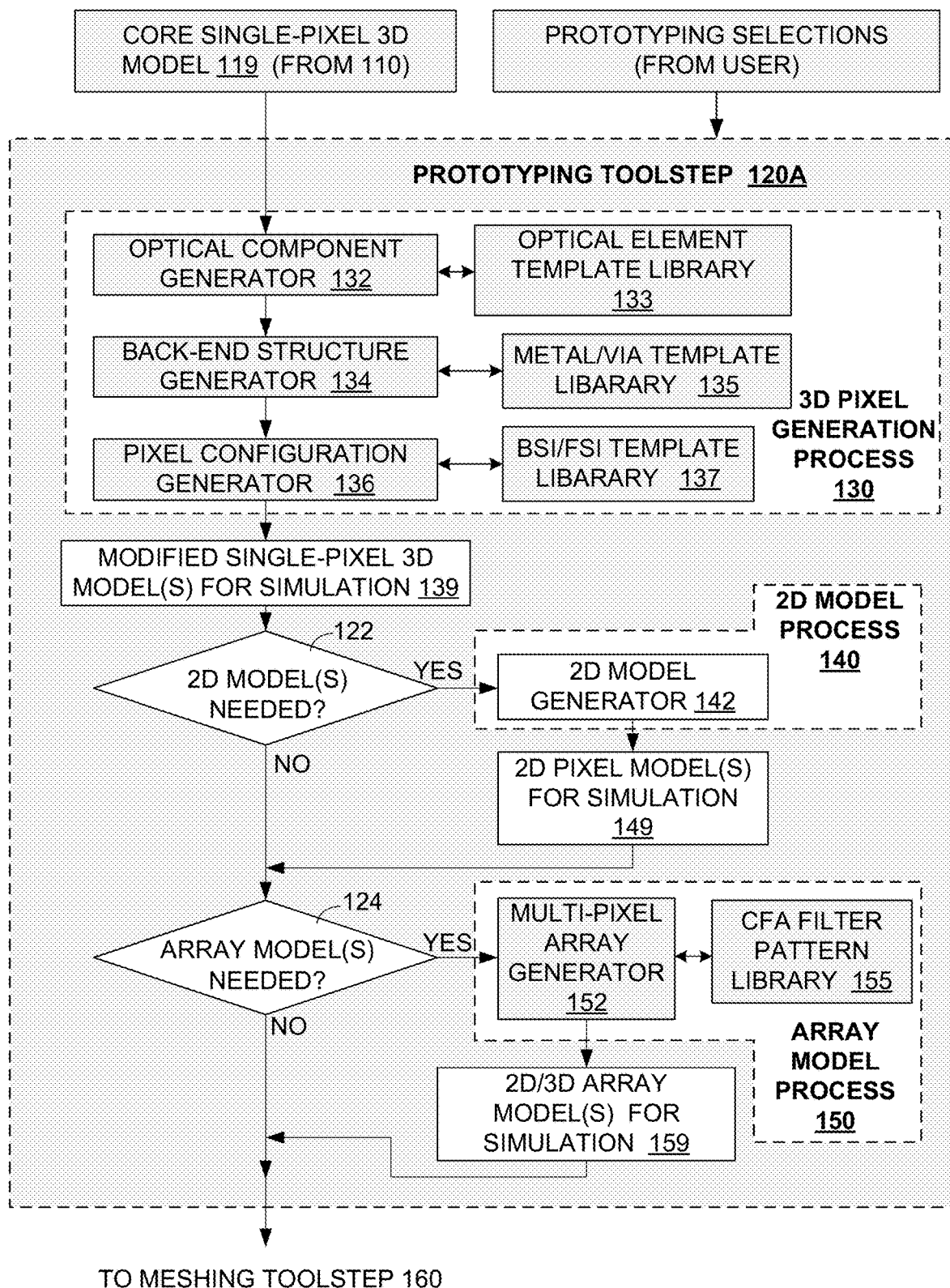
FIG. 4 is a flow diagram depicting a prototyping toolstep of the TCAD software tool of FIG. 1 according to an exemplary specific embodiment.

FIG. 4 depicts a prototyping toolstep 120A configured in accordance with an exemplary specific embodiment. As mentioned above, prototyping toolstep 120A functions to automatically modify core single-pixel 3D model 119 by way of combination with backside (i.e., back-end-of-line or "beol") structures and other configuration details specified by one or more modular templates selected by the designer/user. Specifically, exemplary prototyping toolstep 120A utilizes, in conjunction with the prototyping selections entered by the designer/user, a 3D pixel generation process 130 configured to generate complete single-pixel 3D models 139 specified by the designer/user for optical simulation, a 2D model process 140 configured to automatically generate single-pixel 2D models 149 based on user-defined cross-sections of single-pixel 3D models 139, and an array generation process 150 configured to automatically form multi-pixel arrays using replicas of single-pixel 3D models 139 or single-pixel 2D models 149. In alternative embodiments one or more of these processes, which are described in additional detail below, may be omitted, and one or more additional processes may be included. In one embodiment, at least a portion of prototyping toolstep 120A implements functions that are currently available in the Sentaurus Structure Editor (SDE) produced by Synopsys Incorporated, and is written using Scheme script to perform at least some of the processes depicted in FIG. 4.

Referring to the upper portion of FIG. 4, according to an exemplary embodiment, 3D pixel generation process 130 includes an optical generator 132, a back-end structure generator 134 and a pixel configuration generator 136, each of which being operably linked to an associated template library as described below. As explained below, these processes allow a designer/user to quickly generate multiple pixel configurations for subsequent analysis using a small number of input selections. In alternative embodiments, the various functions performed by 3D pixel generation process 130 may be executed in a sequence different from that depicted in FIG. 4, and other functions may be included that provide optically-relevant and other structures that the designer deems necessary or desirable for optimal operation of the host IC device. Automatically combining optically-relevant layers and other structures and generating alternative configurations using a minimal set of input parameters greatly reduces computer processing time by way of minimizing processing errors that can occur when these structures/layers are submitted with the single-pixel layout file.

Optical component generator 132 facilitates automatically modifying core single-pixel 3D model 119 in accordance with one or more modular templates selected by the user/designer, for example, from an optical element template library 133, such that each modified single-pixel 3D models 139 produced by 3D pixel generation process 130 includes at least one optically-relevant structure design. As indicated in FIG. 5A, in one embodiment optical component generator 132 automatically generates a modified single-pixel 3D model 139-1 by modifying core single-pixel 3D model 119 using a modular template 133A including a three-part optically-relevant structure design made up of a color filter layer 133-1, an anti-reflective layer 133-2 and a micro-lens structure 133-3. In other embodiments, color filter layer 133-1, anti-reflective layer 133-2 and micro-lens structure 133-3 may be stored in associated modular templates, one or more of these optically-relevant structure designs may be selectively omitted, or additional modular templates including other optically-relevant structure designs may be included in modified single-pixel 3D model 139-1. In this way, optical component generator 132 functions to automatically generate alternative pixel designs including different combinations of pre-designed optical layers and components through which incoming light passes on its way to core single-pixel 3D model 119, which substantially reduces the time required to analyze alternative pixel designs in comparison to conventional methods, and also obviates the need for sensor designers to provide suitable optically relevant structures in the single-pixel layout file. That is, the generation of a suitable CMOS image sensor micro-lens is typically considered a complicated geometric task, and an inexperienced designer may spend a significant amount of time generating an acceptable micro-lens "from scratch" using conventional methods. This complicated geometric task is obviated by way of configuring optical component generator 132 to interpret a small number of user-defined parameters, and to select or generate a suitable 3D micro-lens shape using data or templates stored in library 131.

In one embodiment, a back-end structure generator 134 functions to combine core single-pixel 3D model 119 with a suitable back-end structure design that is generated using or copied from a metal/via template library 135. As indicated in FIG. 5A, in one embodiment back-end structure generator 134 automatically generates modified single-pixel 3D model 139-1 by combining core single-pixel 3D model 119 with a modular template 135A including a back-end structure design 135-1 made up of metal lines 135-11 disposed in a dielectric material layer 135-12, where metal lines 135-11 are operably connected by associated interconnect structures (not shown) and configured to transmit electrical signals between relevant contacts of core single-pixel 3D model 119 and external circuitry on the larger integrated circuit design (e.g., host IC device 100, shown in FIG. 2).

In one embodiment, pixel configuration generator 136 functions to arrange selected optically-relevant and back-end structures with core single-pixel 3D model 119 using a selected pixel configuration from a BSI/FSI template library 137. There are many ways to design an image sensor to improve its operation characteristics and overall efficiency. Typically, a designer using a software package would setup completely different pixel designs to explore all of these different designs, but this is time-consuming and requires an intermediate/advanced knowledge of TCAD tools and how to apply the designs correctly. Pixel configuration generator 134 allows the sensor designer to generate multiple model versions that include at least one common structure by way of facilitating replication and re-configuration of structures utilized to generate a first model for use in the generation of a second model. For example, FIG. 5B shows a first modified single-pixel 3D model 139-1A including the various components of FIG. 5A arranged in a FSI (front-side illuminated) configuration (i.e., with back-end structure 135-1 disposed between core single-pixel 3D model 119 and optically-relevant structures 133-1, 133-2 and 133-3). FIG. 5C shows a second modified single-pixel 3D model 139-1B including the various components of FIG. 5A arranged in a BSI (back-side illuminated) configuration (i.e., with core single-pixel 3D model 119 disposed between back-end structure 135-1 and optically-relevant structures 133-1, 133-2 and 133-3). These alternative configurations determine how incident light is received by the sensor, and thus produce different operating characteristics. For the BSI configuration (FIG. 5C), incident light illuminates the device's photodiode through a bottom (rear) surface of the supporting substrate, which minimizes interference but requires a more expensive fabrication process. In contrast, the FSI configuration (FIG. 5B) requires a less expensive fabrication process, but incident light must pass through the back-end layer 135-1 before reaching the device's photodiode. In a presently preferred embodiment, the underlying script executed by pixel configuration generator 136 performs all of the required replication, rotation and translation geometrical operations to properly align the core pixel and the added beol layers in response to a simple user-provided input parameter (e.g., config=BSI or config=FSI) in order to automatically generate the requested design configuration.

Figure 6A:
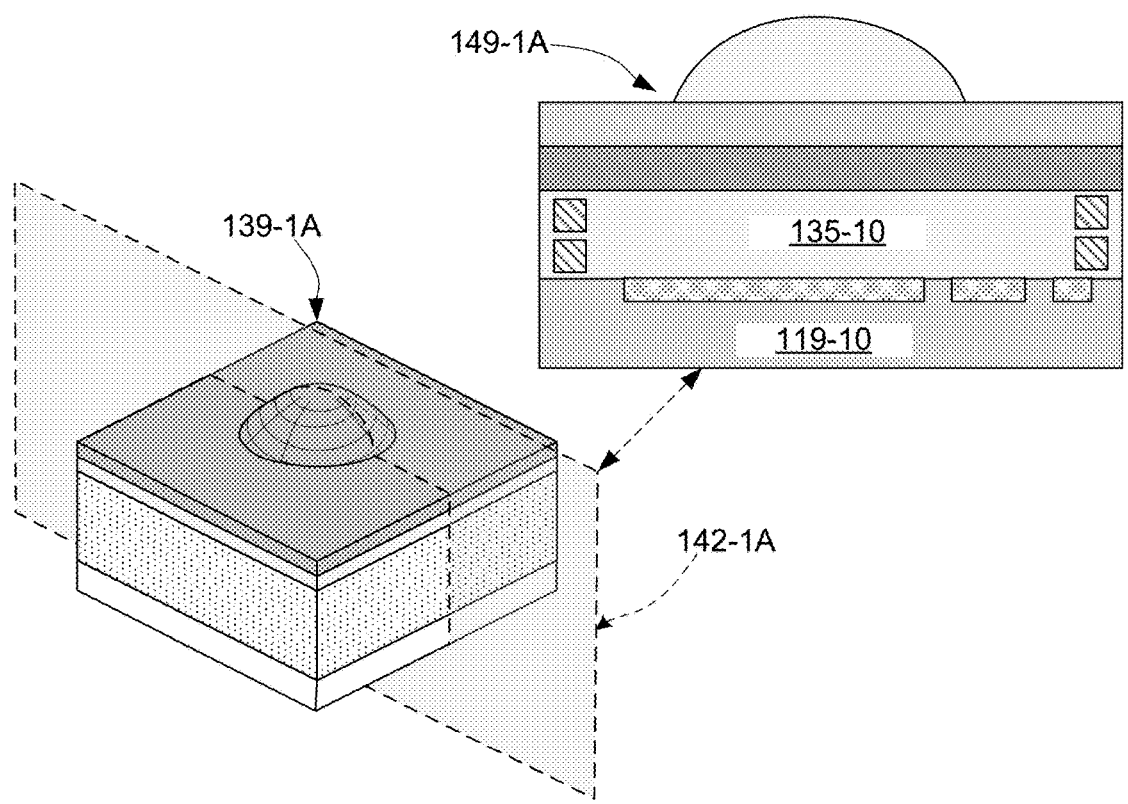
FIGS. 6A and 6B show the formation of single-pixel 2D models according using the alterative FSI and BSI configurations of FIGS. 5B and 5C, respectively.
Figure 6B:
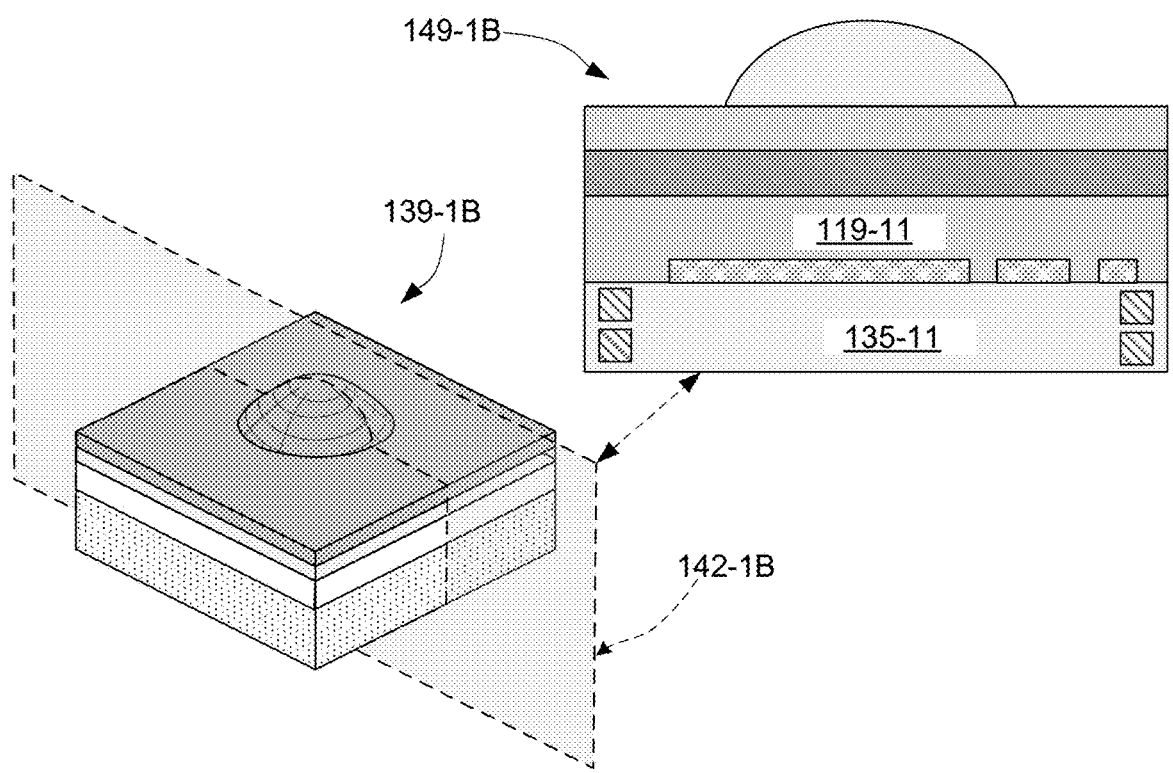

In a presently preferred embodiment, after one or more modified single-pixel 3D models 139 are generated by 3D pixel generation process 130, the designer/user is queried regarding the need for 2D models (block 122), and 2D model process 140 is implemented when the designer/user responds accordingly. A sensor designer typically utilizes 2D simulations early in the development of a CMOS image sensor because 2D design simulations take less time to setup and execute. Decision block 122 allows the designer/user to choose between using modified 3D model 139 or a 2D cross-sectional portion ("cut") of modified 3D model 139. FIG. 6A depicts the process of generating a single-pixel 2D FSI model 149-1A determined by a cross-section (cut) of modified single-pixel 3D model 139-1A as defined by a user-designated cut-plane 143-1A (i.e., where 2D core pixel layer 119-10 is positioned below 2D back-end layer 135-10), and FIG. 6B depicts the process of generating a single-pixel 2D BSI model 149-1B determined by a cross-section of modified single-pixel 3D model 139-1B as defined by a user-designated cut-plane 143-1B (i.e., where 2D core pixel layer 119-11 is positioned above 2D back-end layer 135-11). In one embodiment, 2D model process 140 is executed in response to a simple user-provided input parameter (e.g., by designating "dim=2D" instead of "dim=3D"), and the underlying script of 2D model process 140 reads the user-defined "cuts" and automatically generates and saves the designated 2D cross-sectional portion of the 3D structure.

In the presently preferred embodiment, after one or more modified single-pixel 3D models 139 are generated by 3D pixel generation process 130 or one or more single-pixel 2D models 149 are generated by 2D model process 140, the designer/user is queried regarding the need for multi-pixel arrays (block 124), and array model process 150 is implemented when the designer/user decides that a 2D or 3D multi-pixel array is needed to fully analyze a given pixel design. CMOS image sensors typically have a color light filter array (i.e. CFA) built on top of the active pixel sensor. This light filter allows certain colors/wavelengths of light to penetrate the device where it is then detected by the underlying active pixel sensor. The setup/configuration of this CFA on top of an existing generated model is another time-consuming challenge often faced by designers using TCAD simulation tools. In a presently preferred embodiment, the designer/user designates a selected 2D or 3D pixel model, inputs the size/pattern of the array (e.g., 2×2 or 3×1), and then selects a specific type of CFA (color-filter array) pattern, for example, based on a selected modular template from CFA filter pattern library 155, where the modular templates stored in library 155 include well-known sets of standard CFA filter patterns. In one embodiment, the array model generation process 150 is configured to allow the sensor designer/user to select a standard CFA pattern from library 155, or to define an arbitrary CFA filter pattern to meet specific design criteria. Array model process 150 then automatically generates the requested array by way of duplicating the designated 2D or 3D pixel model and arranging the duplicates in the selected pattern, and then generates the correct CFA pattern based on the user's selection. By generating the 2D and 3D arrays in this manner, array model process 150 is able to quickly generate any array size, and to correctly assign the selected color patterns to any 2D or 3D array, thereby avoiding the long delays associated with generating arrays and correctly assigning color filter patterns using conventional methods. In one embodiment, array model process 150 is configured to allow entry/definition of custom (e.g., non-standard or non-implemented) CFA patterns as a one-time setup process during the operation of TCAD software tool 100. Once the custom CFA pattern is entered, it can be selected and applied to any 2D/3D pixel or array design that the sensor designer defines. The pattern specifications are used to automatically determine how to apply the custom CFA pattern correctly to the structure defined by the user. A database of simulation parameters is maintained that is available to all tool steps in the simulation flow, making it easy for the sensor designer to quickly modify and/or re-configure their setup to test new ideas and quickly prototype different designs or configurations.

Figure 7A:
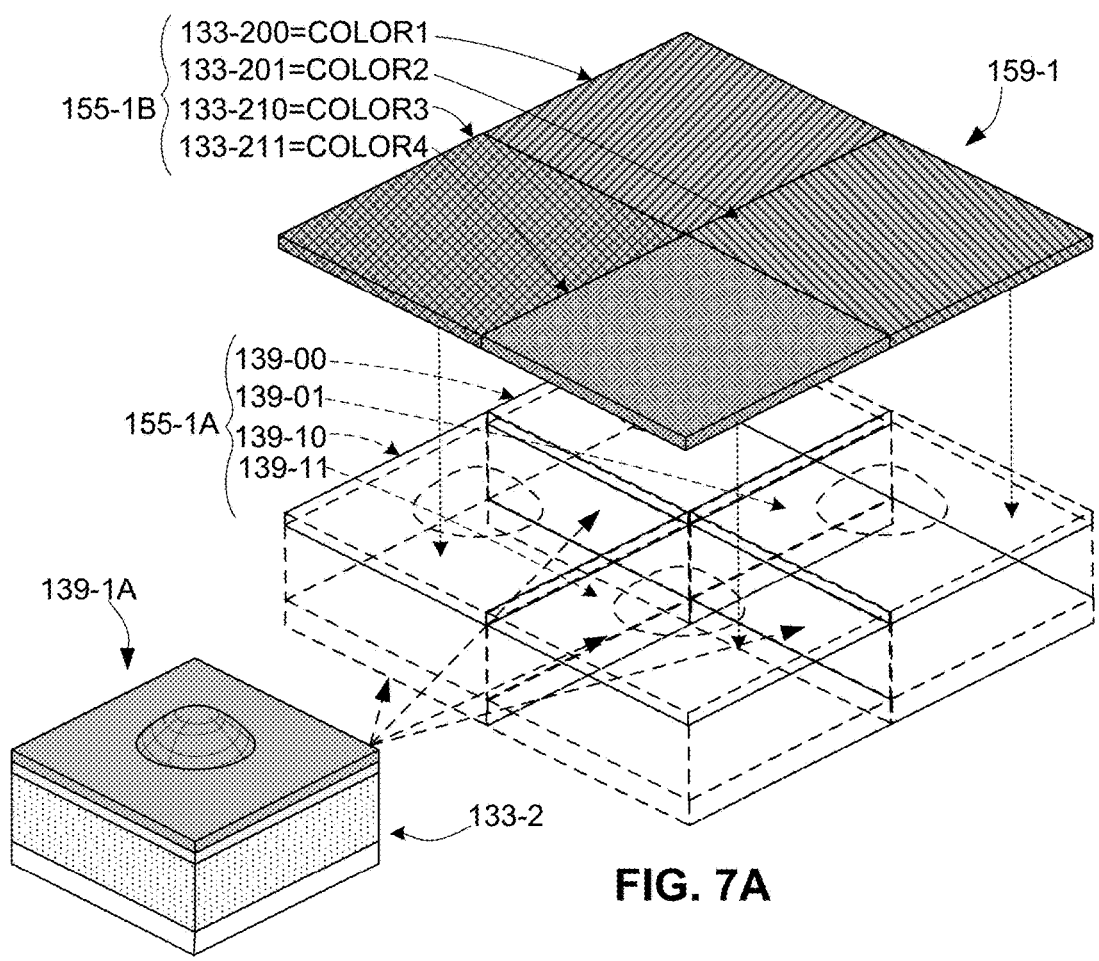
FIGS. 7A and 7B are exploded and assembled perspective views, respectively, showing the formation of a 3D array model according to an exemplary embodiment of the present invention.
Figure 7B:
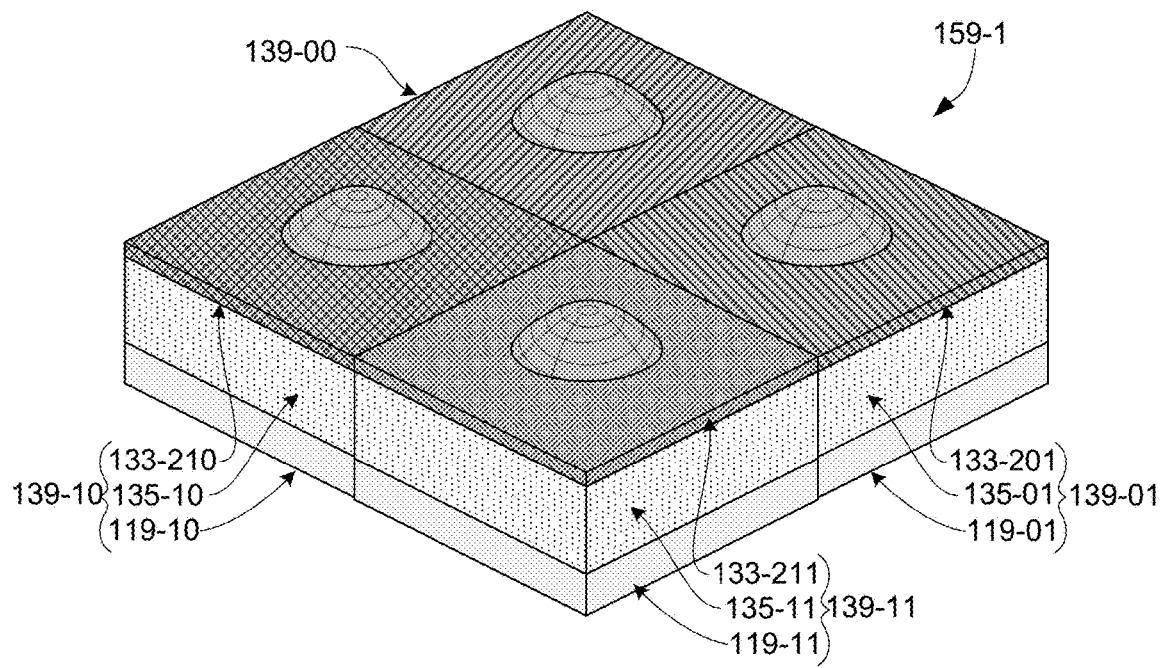

FIGS. 7A and 7B depict the generation of a 3D array model 159-1 according to an exemplary embodiment in which a user requests a 2×2 pattern including four FSI single-pixel 3D models 139-1A (described above with reference to FIG. 5B) and a four-color (e.g., CYGM) color filter pattern. In one embodiment the 2×2 pattern is defined by a template 155-1A that positions four pixels 139-00, 139-01, 139-10 and 139-11 in the square pattern indicated using dashed lines in FIG. 7A, and the four-color (e.g., CYGM) color filter pattern made up of color filters 133-200, 133-201, 133-210 and 133-211 respectively comprising different colors COLOR1 to COLOR4 (e.g., where COLOR1 is cyan, COLOR2 is yellow, COLOR3 is green and COLOR4 is magenta), as defined by a template 155-1B. To generate 3D array model 159-1, array model process 150 duplicates (copies) selected modified single-pixel 3D model 139-1A, and arranges the duplicated modified single-pixel 3D models such that one duplicate pixel model is placed in each of the four pixel positions designated by template 155-1A. In addition, the color filter layer of each duplicate modified single-pixel 3D model 139-00 to 139-11 is modified to include a corresponding color filter 133-200 to 133-211 of the arrangement defined by template 155-1B. Accordingly, as indicated in FIG. 7B, each 3D pixel model 139-00 to 139-11 of assembled 3D array model 159-1 includes a duplicate copy of the core single-pixel 3D model described above with reference to FIG. 3A, a duplicate copy of the back-end structure model and optically-relevant structures described above with reference to FIG. 5A, with a specific color filter designated by template 155-1B. For example, pixel 139-10 includes duplicate core single-pixel 3D model 119-10, back-end structure model 135-10 and color filter 133-210. Similarly, pixel 139-11 includes duplicate core single-pixel 3D model 119-11, back-end structure model 135-11 and color filter 133-211, and pixel 139-01 includes duplicate core single-pixel 3D model 119-01, back-end structure model 135-01 and color filter 133-201. Although the functionality of this script relies upon existing SDE tool commands, the combination of these commands with additional external Scheme scripts provides the user with a robust and easy way to build complicated arrays of CMOS image sensors and to apply arbitrary color-filter array patterns to these structures.

Figure 8A:
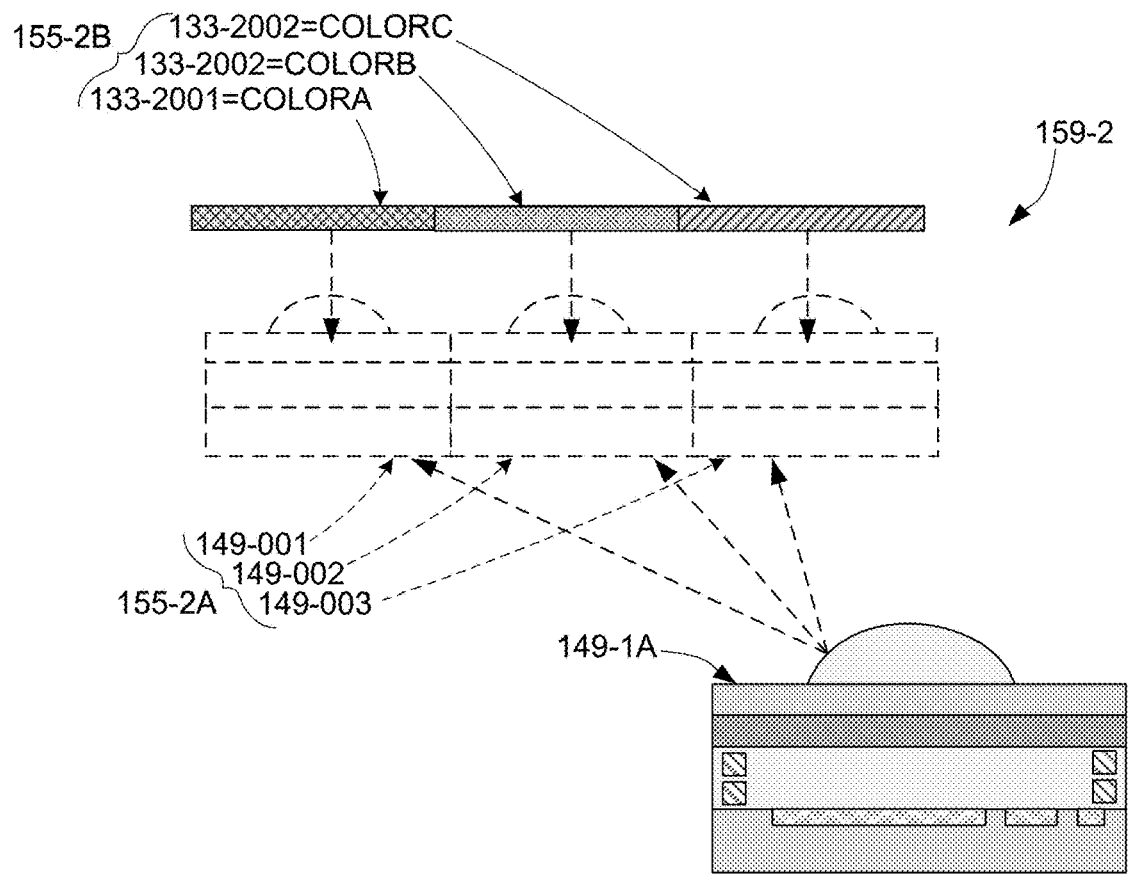
FIGS. 8A and 8B are exploded and assembled views, respectively, showing the formation of a 2D array model according to another exemplary embodiment of the present invention.
Figure 8B:
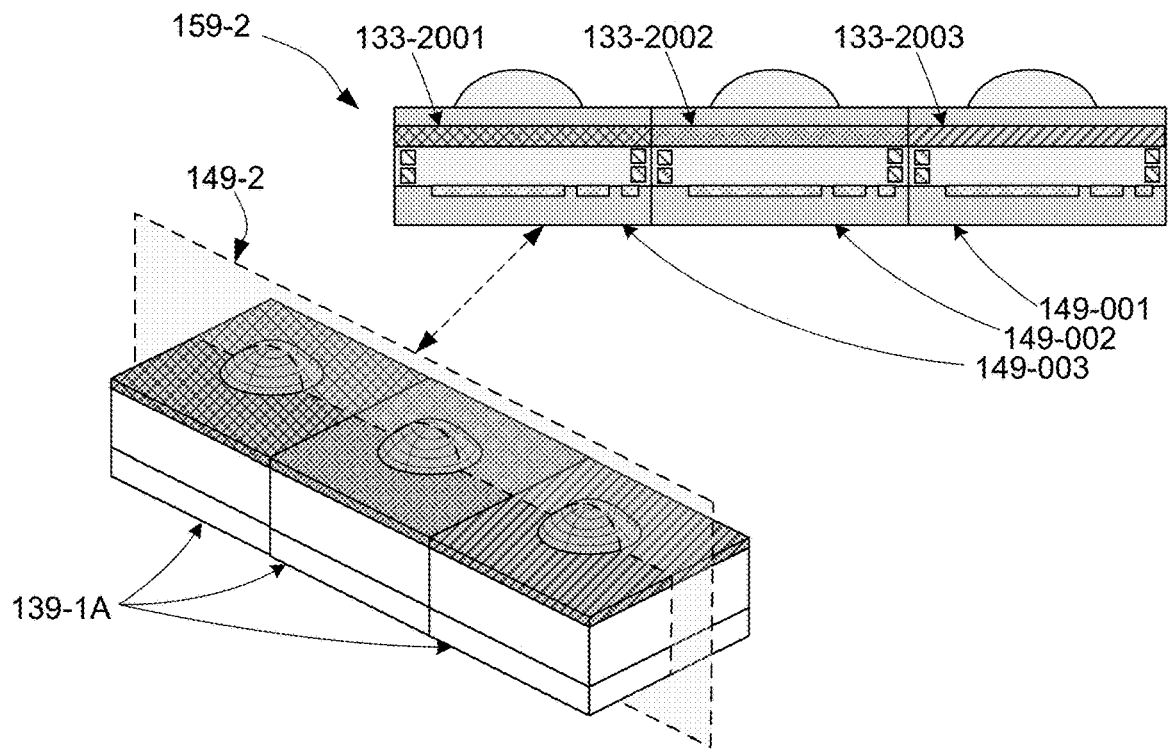

FIGS. 8A and 8B depict the generation of a 2D array model 159-2 according to an exemplary embodiment in which a user requests a 3×1 pattern including three FSI single-pixel 2D models 149-1A (described above with reference to FIG. 6A) and a three-color (e.g., RGB) color filter pattern. In one embodiment the 3×1 pattern is defined by a template 155-2A that positions three 2D pixels 149-001, 149-002 and 149-003 in the linear pattern indicated using dashed lines in FIG. 8A, and the three-color (e.g., CYGM) color filter pattern made up of color filters 133-2001, 133-2002, 133-2003 respectively comprising different colors COLORA to COLORC (e.g., where COLORA is red, COLORB is green and COLORC is blue), as defined by a template 155-2B. To generate 2D array model 159-2, array model process 150 duplicates modified single-pixel 2D model 149-1A, arranges the duplicated modified single-pixel 2D models such that one duplicate pixel model is placed in each of the three pixel positions 149-001, 149-002 and 149-003 designated by template 155-2A, and modifies the color filter layer of each duplicate modified single-pixel 2D model 149-001 to 149-003 to include color filters 133-2001 to 133-2003, respectively, as defined by template 155-1B. Accordingly, as indicated in FIG. 8B, each 2D pixel model 149-001 to 149-003 of assembled 2D array model 159-2 includes a duplicate copy of the core single-pixel 2D model described above with reference to FIG. 3A, a duplicate copy of the back-end structure model and optically-relevant structures described above with reference to FIG. 6A, with a specific color filter designated by template 155-1B.

Referring again to FIG. 1, because each 2D or 3D pixel/array model 139, 149 or 159 generated by array model process 150 is derived from one or more corresponding single-pixel 2D or 3D models, all modified pixel/array models passed from prototyping toolstep 120 to mesh generation toolstep 160 necessarily include at least a portion of a corresponding modified single-pixel 3D model 139. That is, referring to FIG. 4, when a designer/user wishes to perform simulation on a selected single-pixel 3D model 139 (i.e., by way of initiating the "NO" branch from decision blocks 122 and 124), the entirety of the selected single-pixel 3D model 139 is passed to mesh generation toolstep 160. When the designer/user wishes to perform simulation on a selected single-pixel 2D model 149 (i.e., by way of initiating the "YES" branch from decision block 122 and initiating the "NO" branch from decision block 124), the selected single-pixel 2D model 149, which comprises a cross-sectional "cut" portion of a corresponding 3D model 139, is passed to mesh generation toolstep 160. When the designer/user wishes to perform simulation on a selected 3D array model (i.e., by way of initiating the "NO" branch from decision block 122 and initiating the "YES" branch from decision block 124), the entirety of multiple replicas of the selected single-pixel 3D model 139 is passed to mesh generation toolstep 160, as indicated by exemplary 3D array model 159-1 in FIG. 7B. Finally, when the designer/user wishes to perform simulation on a selected 2D array model (i.e., by way of initiating the "YES" branches from both decision blocks 122 and 124), the selected 2D array model, which comprises cross-sectional "cut" portions of multiple replicas of the selected 3D model 139, is passed to mesh generation toolstep 160. That is, as indicated at the bottom of FIG. 8B, each single-pixel 2D model 149-001, 149-002 and 149-003, which collectively form 2D array model 159-2, is effectively defined by a cross-sectional portion of corresponding modified single-pixel 3D model 139-1A (described above with reference to FIG. 5B).

Referring again to FIG. 4, in addition to generating the various modified 2D/3D pixel/array pixel/array models described above, prototyping toolstep 120A may be configured to perform additional functions. In one embodiment, array model process 150 is further configured to automatically generate and assign unique index-tagged names to every region and contact in a modified 2D/3D array model. For example, assuming a sensor designer forms a 3×3 array model (i.e., nine pixels arranged in three rows and three columns), and assuming each of the nine pixels included ten regions and six contacts, the 3×3 array model would have a total of 144 regions/contacts that would require uniquely names. As set forth above, each of the nine pixels is a replica of a selected modified single-pixel model, and each region/contact of the selected modified single-pixel model is automatically assigned a user-designated name by structure generation toolstep 110A (described with reference to FIGS. 3A and 3B). Because the pixels are arranged in an array, array model process 150 automatically generates and assigns unique index-tagged names to every region and contact by way of modifying each user-designated name to include the row-column designation of the pixel in which the region/contact resides in the array. For example, referring to array 159-1 in FIG. 7A, the names automatically generated for the photodiode regions of pixels 139-00 to 139-11 would be modified to include the row/column designation "00", "01", "10" or "11" corresponding to pixel in which each photodiode is disposed (e.g., the photodiode of pixel 139-00 is automatically named "P00", and the photodiode of pixel 139-01 is automatically named "P01"). This automatic region/contact naming process makes it very easy for a sensor designer to quickly access a region/contact in any pixel of an array while trying to setup any subsequent optical or device simulation. This also allows the sensor designer to quickly specify subsequent simulations which may only target a portion of the array or a single pixel in the array. Without this functionality, the sensor designer must manually assign unique names to everything and the time this would take in a production environment makes this and unrealistic expectation for the sensor designer.

Referring briefly again to FIG. 1, after prototyping toolstep 120 generates one or more modified models (i.e., one or more modified single-pixel 3D models 139, one or more modified single-pixel 2D models 149, and/or one or more modified 2D/3D array models 159), each of the generated modified models is passed to mesh generation toolstep 160. In one embodiment, mesh generation toolstep 160 generates one or more simulation models 169 for each received model 139/149/159, where each simulation model 169 includes optical mesh information, and also includes an optional mixed-element mesh. The optical mesh information is generated in a suitable format using known techniques, and is required for modeling the propagation of light through the various materials forming the associated 2D/3D pixel/array model 139, 149 or 159 during subsequent optical simulation performed by simulation toolstep 170. According to a presently preferred embodiment, mesh generation toolstep 160 generates all optical mesh information for a given model 139/149/159 after operation of prototype toolstep 120 is completed. In contrast, the optional mixed-element mesh, which is required for modeling the electrical characteristics of the 2D/3D pixel/array model 139, 149 or 159 during device simulation, may be generated at least in part before or during the operation of prototype toolstep 120 (e.g., portions of mesh generation toolstep 160 may be used to generate a mixed-element mesh for core single-pixel 3D model 119 during structure generation toolstep 110, or to generate a mixed-element mesh for modified 2D/3D pixel/array models during prototyping toolstep 120). Because the present invention is primarily directed to the development of image sensors using optical simulation, detailed descriptions of the generation of mixed-element meshes and the performance of device simulation are omitted herein for brevity. However, it should be noted that beneficial aspects of the present invention (e.g., the ability to quickly generate multiple pixel and array models using prototyping toolstep 120) may also be utilized to simulate and develop electrical (device) aspects of an IC design as well.

Figure 9:
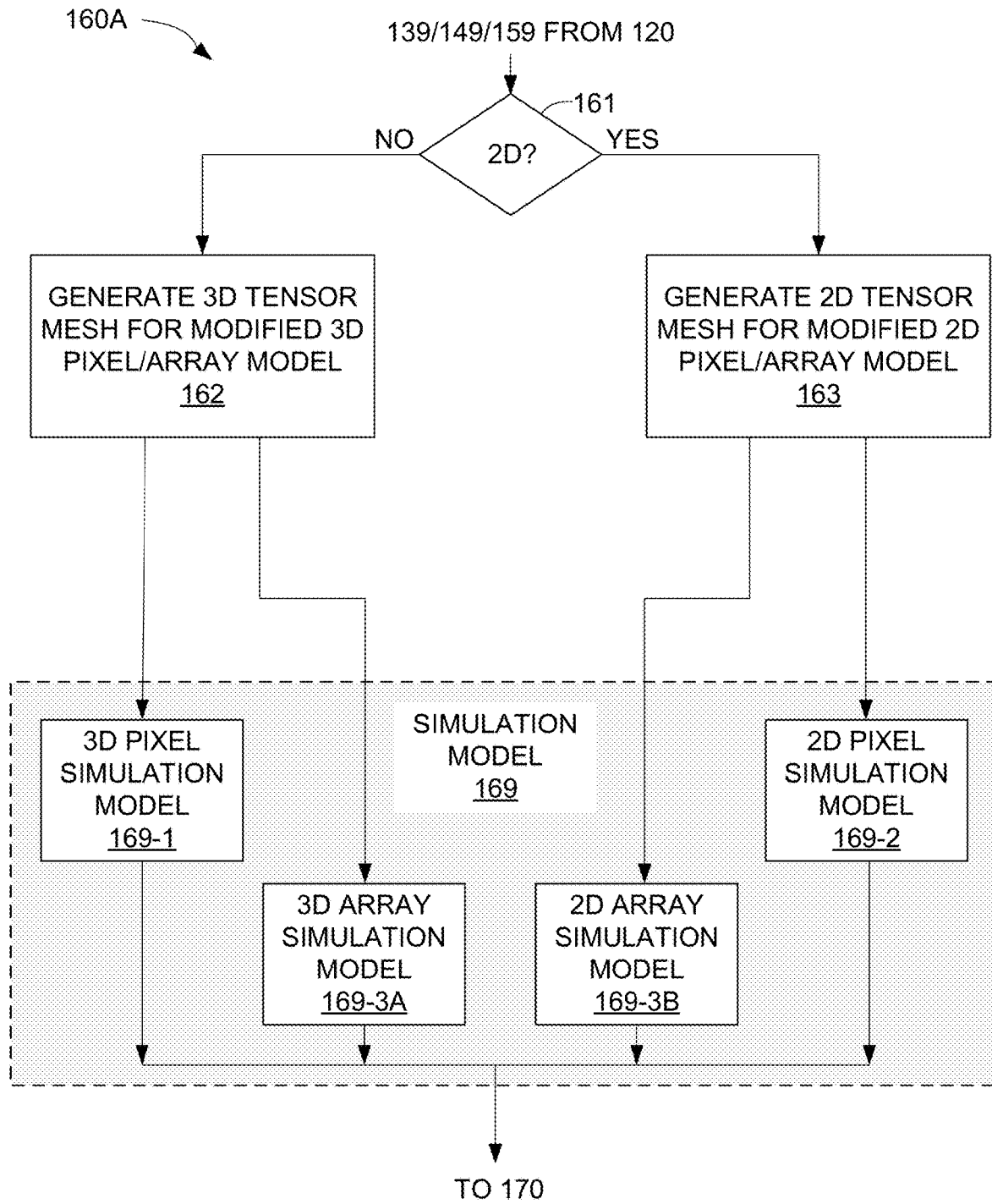
FIG. 9 is a flow diagram depicting a mesh generation toolstep of the TCAD software tool of FIG. 1 according to another exemplary specific embodiment.
Figure 10:
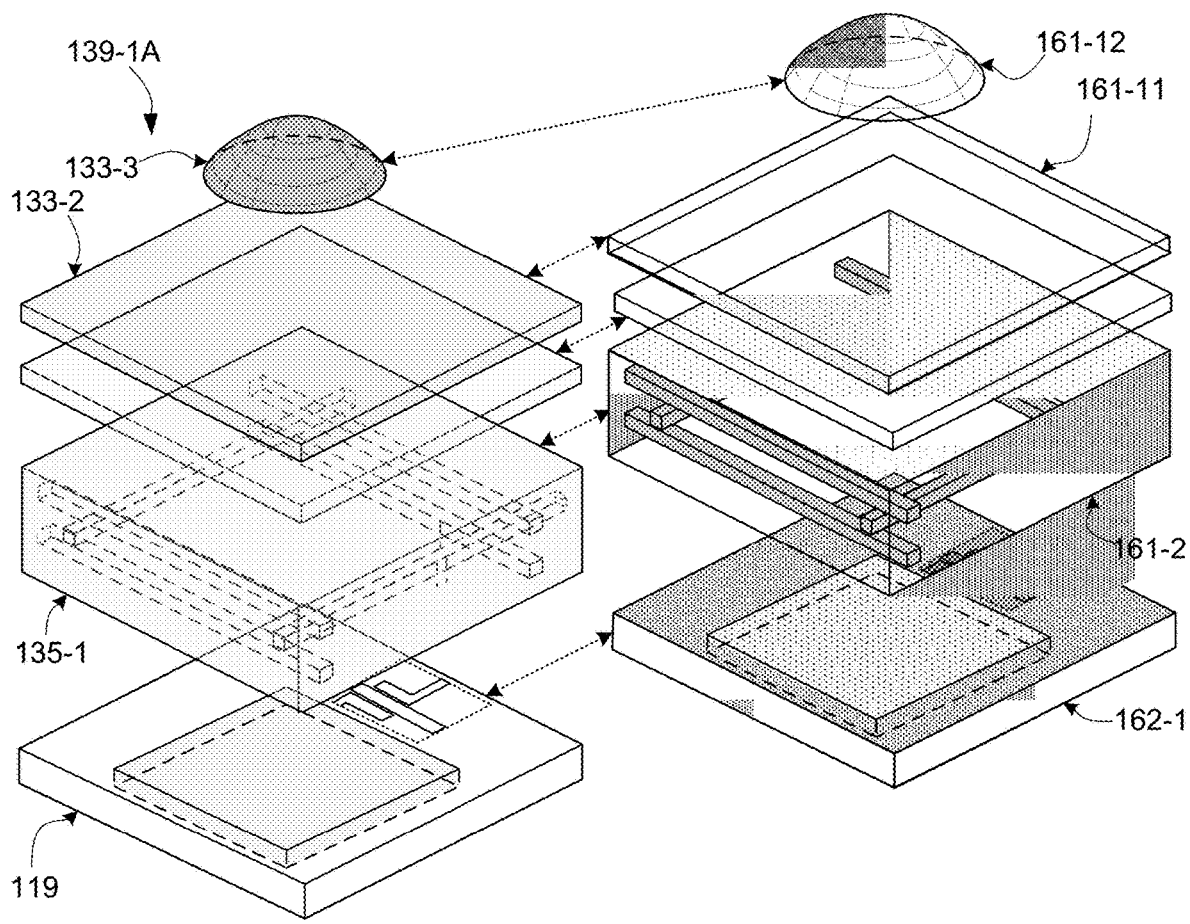
FIG. 10 is an exploded perspective view showing the formation of a 3D simulation model using the mesh generation toolstep of FIG. 9 according to another exemplary embodiment of the present invention.
Figure 11A:
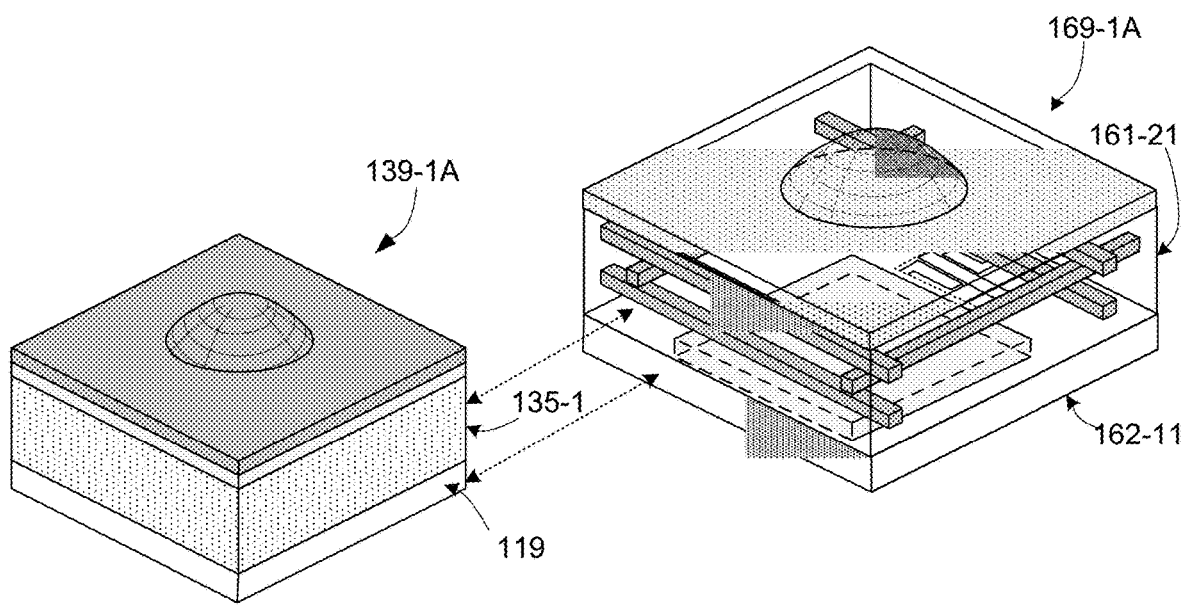
FIGS. 11A and 11B are two-part perspective views showing the formation of alternative single-pixel 3D simulation models using the mesh generation toolstep of FIG. 9 according to another exemplary embodiment of the present invention.
Figure 11B:
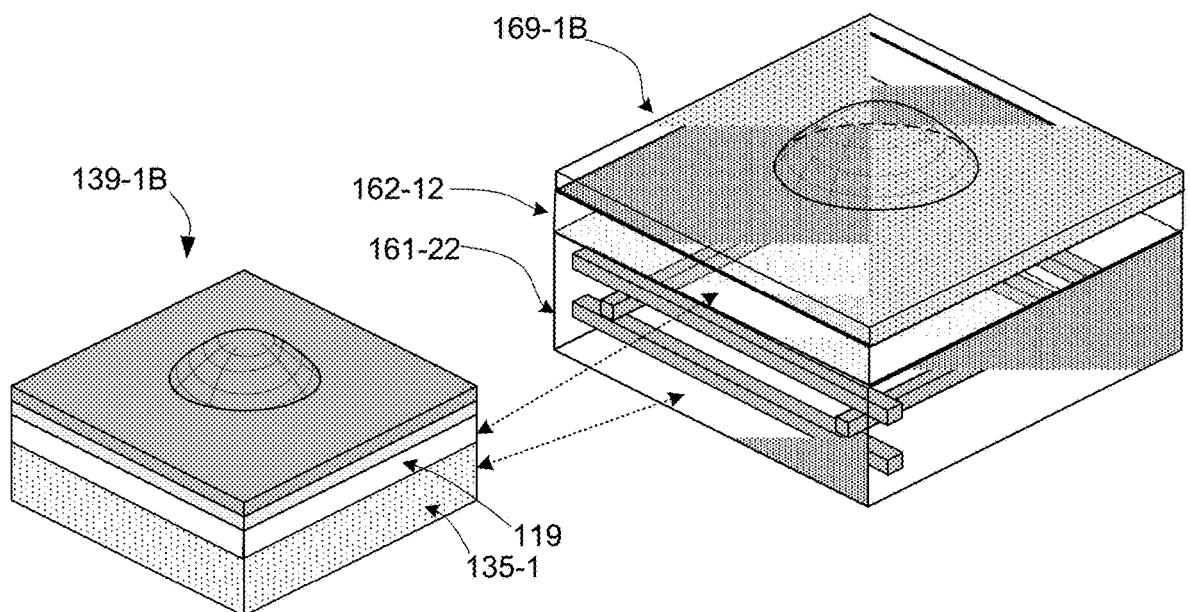
Figure 12:
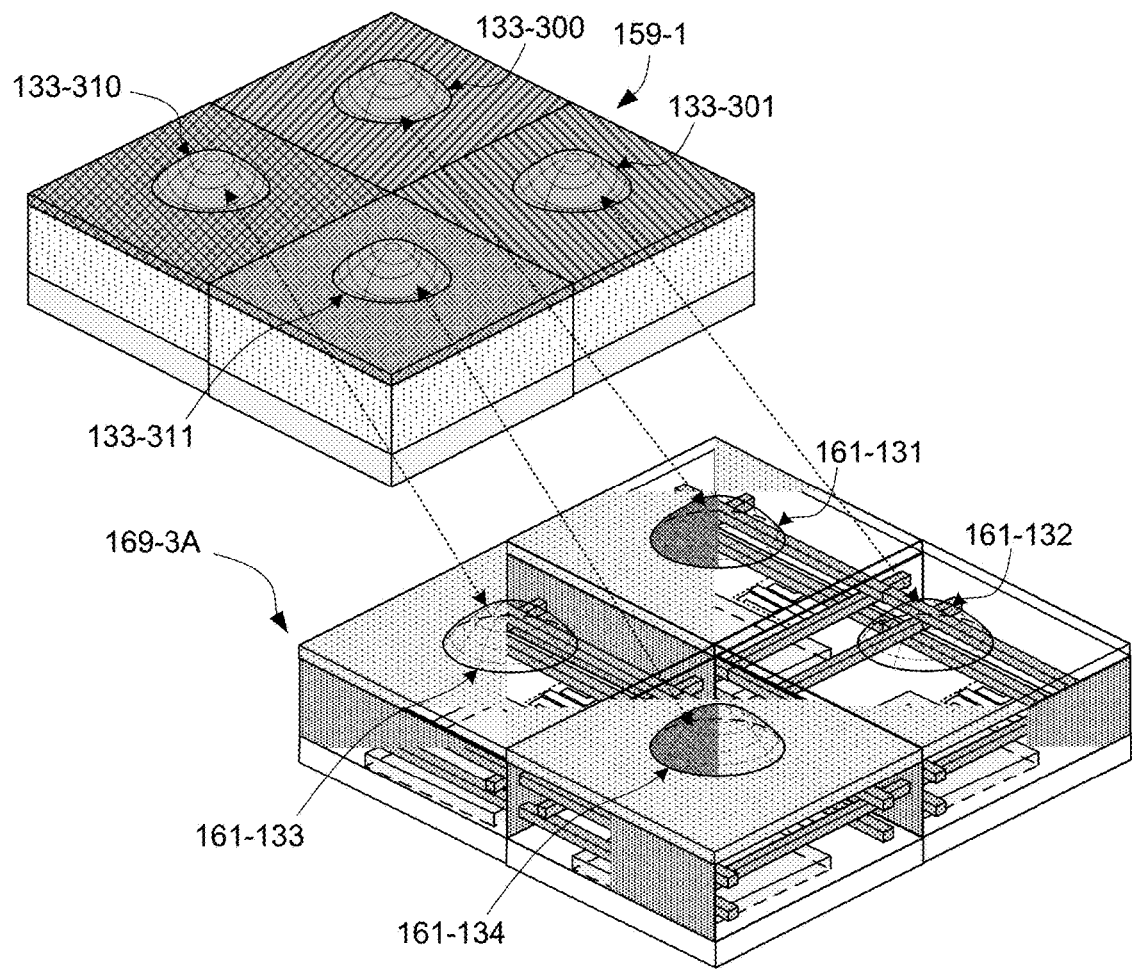
FIG. 12 is a two-part perspective view depicting the formation of a 3D array simulation model using the mesh generation toolstep of FIG. 9 according to another exemplary embodiment of the present invention.

FIG. 9 depicts a mesh generation toolstep 160A according to a simplified exemplary specific embodiment of the present invention. Referring to the top of FIG. 9, upon receiving a model 139/149/159 from prototyping toolstep 120, the 2D/3D status of the received model is determined (decision block 161), whereby the optical mesh generation process is limited to the generation of 2D optical mesh information in the case of a 2D pixel/array model (YES branch from block 161), and 3D optical mesh information is only generated in the case of a 3D pixel/array model (NO branch from block 161). Referring to the upper left portion of FIG. 9, in the case of either a 3D pixel model 139 or a 3D array model, mesh generation toolstep 160A generates 3D tensor (optical) mesh information for each structure/region of the received 3D model (block 162). For example, as indicated in FIG. 10, when single-pixel 3D model 139-1A is passed from the prototyping toolstep to mesh generation toolstep 160A, tensor mesh information 161-11 is generated for color filter layer 133-2, tensor mesh information 161-12 is generated for micro-lens structure 133-3, tensor mesh information 161-2 is generated that operably models each structure/region of back-end structure design 135-1, and tensor mesh information 161-3 is generated that operably models each structure/region of core single-pixel 3D model 119. In a presently preferred embodiment, the 3D tensor mesh information is generated for each structure of single-pixel 3D model 139-1A using suitable 3D (e.g., cuboid-type) tensor mesh elements, and the 3D tensor mesh information generated for each structure/region collectively forms the required 3D pixel simulation model 169-1 that is submitted to simulation toolstep 170. In a presently preferred embodiment, a separate tensor mesh is generated for each 3D single-pixel model. For example, as indicated in FIG. 11A, tensor mesh information 161-21 and 162-11 are respectively generated for back-end structure design 135-1 and core single-pixel 3D model 119 during the generation of simulation model 169-1A for FSI single-pixel 3D model 139-1A, and as indicated in FIG. 11B, tensor mesh information 161-22 and 162-12 are respectively separately generated for the same structures/regions of BSI single-pixel 3D model 139-1A. The generation of optical mesh information requires substantially less processing time than that required to perform structure generation, so sharing of common optical mesh information (e.g., in a manner similar to that described above with reference to FIGS. 5B and 5C) is not believed to provide a significant time advantage. Similarly, as generally indicated in FIG. 12, tensor mesh information is generated for each structure/region of a 3D single-pixel model. That is, simulation model 169-3A is generated for 3D array model 159-1 by way of separately generating tensor mesh information for each structure/region of each of the four pixels making up 3D array model 159-1 (e.g., tensor mesh information 161-131 through 161-134 are respectively generated for micro-lens structures 133-300, 133-301, 133-310 and 133-311).

Figure 13A:
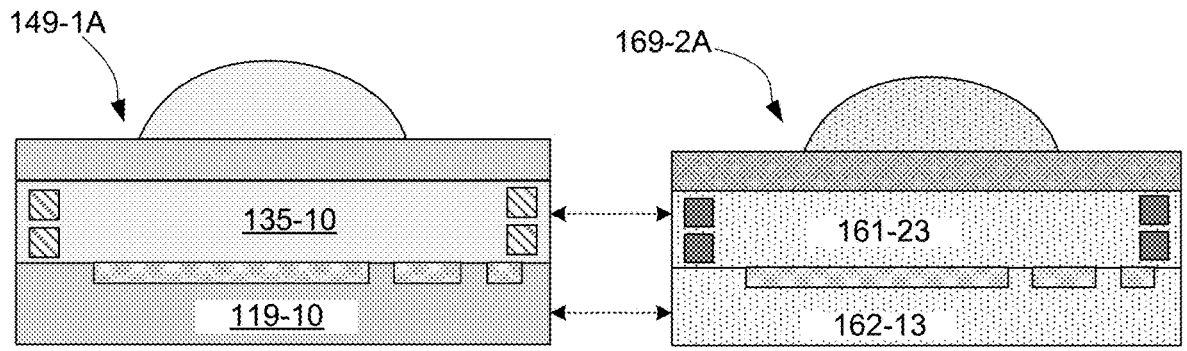
FIGS. 13A and 13B are two-part side views showing the formation of alternative single-pixel 2D simulation models using the mesh generation toolstep of FIG. 9 according to another exemplary embodiment of the present invention.
Figure 13B:
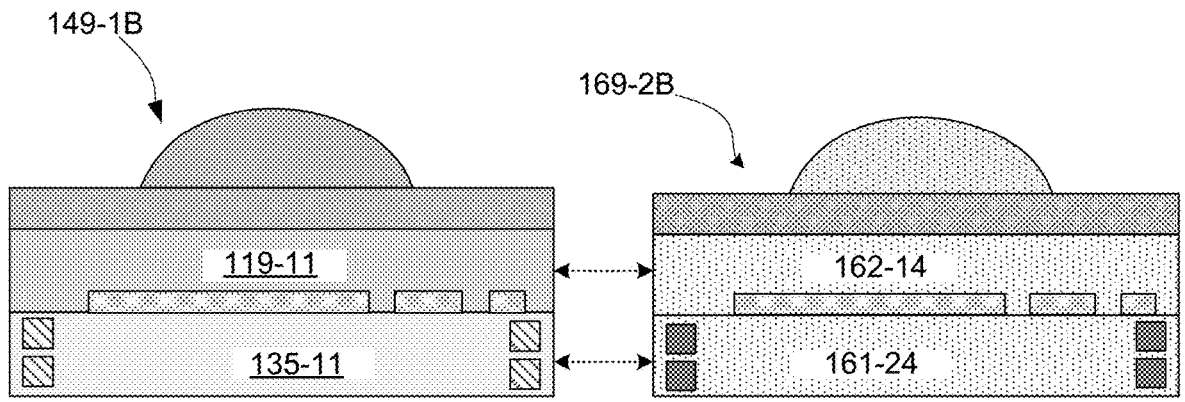
Figure 14:
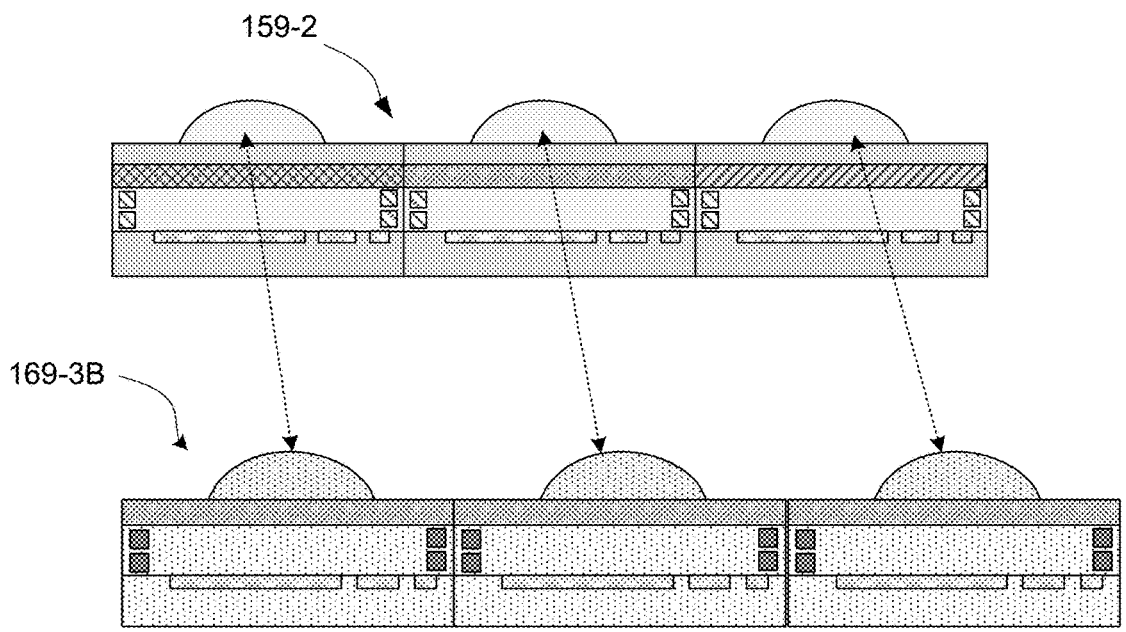
FIG. 14 is a two-part side view depicting the formation of a 2D array simulation model using the mesh generation toolstep of FIG. 9 according to another exemplary embodiment of the present invention.

Referring to the upper right portion of FIG. 9, in the case of either a 2D pixel model 149 or a 2D array model, mesh generation toolstep 160A similarly generates 2D tensor (optical) mesh information for each structure of the received 2D model. As illustrated in FIGS. 13A and 13B, in a manner similar to that described above, simulation model 169-2A is generated by way of generating associated 2D tensor mesh information for each structure/region of FSI single-pixel 2D model 149-1A (see FIG. 13(A), and simulation model 169-2B is generated by way of separately generating associated 2D tensor mesh information for each structure/region of BSI single-pixel 2D model 149-1B (see FIG. 13B). FIG. 14 depicts the generation of a 2D array simulation model 169-3B comprising 2D tensor mesh information that has been separately generated for each structure/region of 2D array model 159-2. In a presently preferred embodiment, the 2D tensor mesh information is generated for each structure of a single-pixel 2D model using suitable 2D (e.g., rectangular-type) tensor mesh elements.

Referring again to FIG. 1, after one or more simulation models 169 are generated by mesh generation toolstep 160, simulation toolstep 170 performs optical simulation for each simulation model 169. Simulation toolstep 170 is heavily parameterized, meaning that the sensor designer's interaction with this tool step is almost completely controlled by specifications provided in the selected modular templates that form a portion of each simulation model 169. In an exemplary embodiment, the simulation process involves loading the optical (tensor) mesh information provided with a given simulation model 169, executing FDTD simulation (e.g., single λ planewave or Broadband/DFT) using normal and/or oblique incidence, with plot files saved in a format suitable for GIF animation. In one embodiment, simulation toolstep 170 includes "emw_maxdev" and "movie" processes, which provide advanced visualization of the optical simulation results. The designer can easily enable the movie process (e.g., by setting a variable movie=1), whereby a snapshot of the instantaneous simulation results (e.g., one or more graph points depicting responses of the simulation model to applied stimuli) is periodically captured and saved during the simulation process. The movie process compiles previously generated snapshot images into an animated GIF file that can be run directly with the project GUI, thereby enhancing analysis of each simulation model. A unique feature implemented during display of graphical plots showing the simulation results, for example, on a computer monitor, is the automatic color-coding of the simulation result curves such that each displayed curve has a color corresponding to the simulated visible light frequency. For example, a plot showing the response of the simulation model to applied red light having a wavelength in the range of 620 to 750 nm (i.e., with a visible light frequency in the range of 400 to 484 THz) is automatically displayed using a red-colored curve, and a plot showing the response of the simulation model to applied green light having a wavelength in the range of 495 to 570 nm (i.e., with a visible light frequency in the range of 526 to 606 THz) is automatically displayed using a green-colored curve. This display format makes it very easy for the designer to quickly identify which curves go with which simulations without having to rely on the legend labels. Exiting functionality in Sentaurus Visual is harnessed via Tcl scripting to dynamically monitor the progress of an optical simulation to provide the sensor designer with a graphical plot of the progress the simulation at any point in the simulation.

In one embodiment, simulation toolstep 170 also includes "qe" (quantum efficiency), "compute_qe" and "plot_qe" toolsteps. These toolsteps provide only one example of how the modular design of the project flow can be specified to support a specific type of simulation aimed at simulating and computing certain key figures of merit such as quantum efficiency (qe). There are many other important figures of merit that image sensor designers are interested in such as: image lag, blooming, transient circuit analysis, noise, etc. There are dozens of other key parameters. The modular nature of this design flow, makes it very easy to replace the "qe"+"compute_qe"+"plot_qe" tool steps at the end of the flow with a similar set of tool steps focused on different figures of merit. Everything before these steps remains the same, all the user must do is modify the toolscript to support the type of physics and or physical models required to simulate the effect or phenomena they are interested in capturing. Traditionally, providing sensor designers with a robust design flow that achieves viable simulation models (i.e., where the sensor designer can run actual simulation and extract useful data) traditionally requires extensive project setup and debugging just to model the sensor structure(s). Therefore having a sensor design template already specified to build and configure a certain structure and/or different configurations of that structure greatly simplifies the overall process and allows a sensor designer to closely focus on the physics of their devices and to quickly generate data for their designs rather than spending the majority of their time just building and specifying the actual 2D/3D structures to be used for optical simulations.

As set forth above, improved TCAD software tool 100 addresses problems associated with conventional approaches by simplifying all of the time-consuming front-end tasks, thereby making it easier for sensor designers to quickly specify simulations and generate critical data for the product development set forth below, and by significantly reducing the amount of time required for a computing system, such as that described below, to perform TCAD operations.

Technology Specific EDA System/Workflow Explanation

Figure 15:
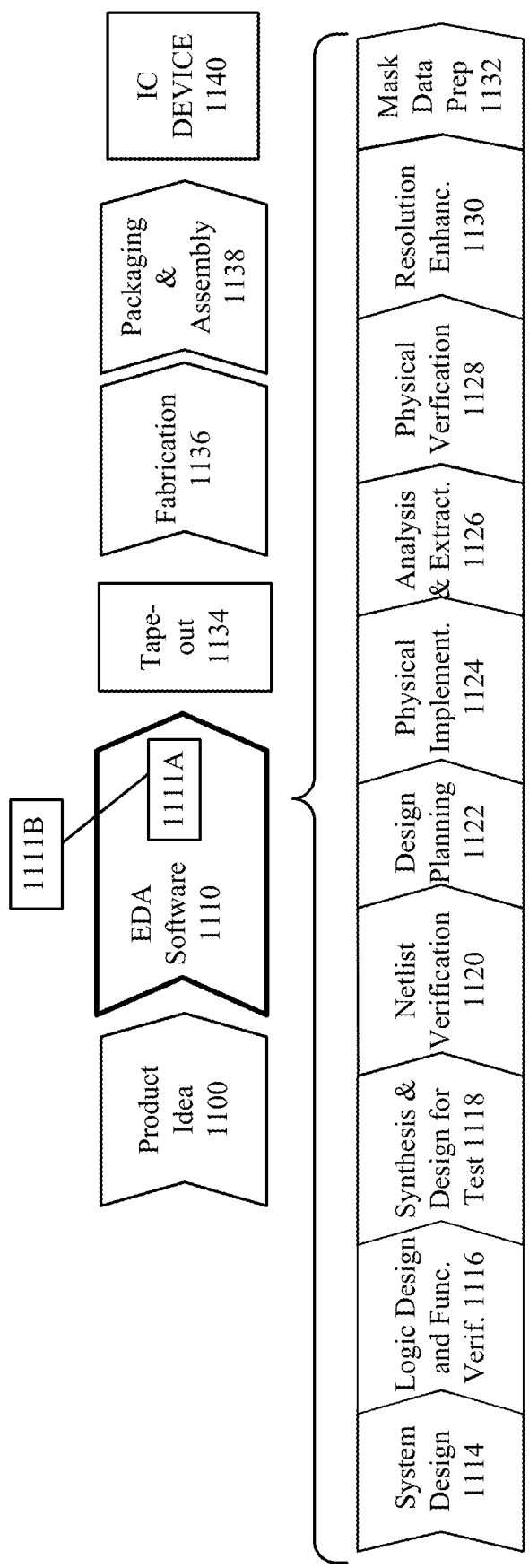
FIG. 15 is a flowchart illustrating various operations in the design and fabrication of an integrated circuit in accordance with an embodiment of the present disclosure.

FIG. 15 illustrates various processes performed in the design and fabrication of IC devices using software tools with a computer to transform data and instructions that represent the associated IC devices. These processes start with the generation of a product idea (1100) with information supplied by one or more circuit designers. The product idea is realized as the evolving circuit design, which is described above, during the circuit design process performed by the circuit designer(s) using EDA software tools (1110). One or more steps of the EDA software design process performed by EDA software tools (1110) is implemented using a computer-readable medium 1111A that is read by a computer 1111B. EDA software tools may also be signified herein using the singular "EDA software tool", as EDA software, or as a design tool. When a circuit design is finalized, it is typically taped-out (1134), and then multiple ICs, each being a physical implementation of the final circuit design, are fabricated on a semiconductor wafer (1136) using a selected technology node. The semiconductor wafer is then diced into individual chips, with each chip including one of the ICs, and then the chips are packaged and assembled using corresponding processes (1138), resulting in finished IC device 1140.

Note that the design process that uses EDA software tools (1112) includes operations 1114-1132, which are described below. This design flow description is for illustration purposes only and is not meant to limit the present disclosure. For example, an actual circuit design may require a circuit designer to perform the design operations in a different sequence than the sequence described herein.

During system design (1114), a circuit designer describes the functionality to be performed by the manufactured IC device. The designer can also perform what-if planning to refine the functionality and to check costs. Note that hardware-software architecture partitioning can occur at this stage. Exemplary EDA software products from Synopsys, Inc. of Mountain View, Calif. that can be used at this stage include: Model Architect, Saber, System Studio, and Designware products. Cells or other descriptions including all relevant information pertaining to the two-part USB PHY configuration of the present invention are typically copied from a library accessible by way of the EDA software tool, and inserted into a circuit design during the system design process.

Then, during logic design and functional verification (1116), VHDL or Verilog code for modules in the circuit is written and the design is checked for functional accuracy. More specifically, the design is checked to ensure that it produces the correct outputs. The VHDL or Verilog code is software comprising optimized readable program instructions adapted for the efficient description of a logic design. Exemplary EDA software products from Synopsys, Inc. of Mountain View, Calif. that can be used at this stage include: VCS, Vera, Designware, Magellan, Formality, ESP and Leda products.

Next, during synthesis and design for test (1118), VHDL/Verilog code is translated to a netlist. This netlist can be optimized for the target technology. Additionally, tests can be designed and implemented to check the finished integrated circuit. Exemplary EDA software products from Synopsys, Inc. of Mountain View, Calif. that can be used at this stage include: Design Compiler, Physical Compiler, Test Compiler, Power Compiler, FPGA Compiler, Tetramax, and Designware products.

Moreover, during netlist verification (1120), the netlist is checked for compliance with timing constraints and for correspondence with the VHDL/Verilog code. Exemplary EDA software products from Synopsys, Inc. of Mountain View, Calif. that can be used at this stage include: Formality, Primetime, and VCS products.

Furthermore, during design planning (1122), an overall floor plan for the integrated circuit is constructed and analyzed for timing and top-level routing. Exemplary EDA software products from Synopsys, Inc. of Mountain View, Calif. that can be used at this stage include: Astro and IC Compiler products. In one embodiment, the TCAD tool described herein may be utilized to verify the circuit design versions generated during design planning.

Additionally, during physical implementation (1124), the placement (positioning of circuit elements such as transistors or capacitors) and routing (connection of the same by a plurality of conductors) occurs. Exemplary EDA software products from Synopsys, Inc. of Mountain View, Calif. that can be used at this stage include: Astro and IC Compiler products. In one embodiment, the TCAD tool described herein may be utilized to verify the circuit design versions generated during design planning.

Then, during analysis and extraction (1126), the circuit function is verified at a transistor level, which permits refinement of the logic design. Exemplary EDA software products from Synopsys, Inc. of Mountain View, Calif. that can be used at this stage include: Astrorail, Primerail, Primetime, and Star RC/XT products.

Next, during physical verification (1128), the design is checked to ensure correctness for manufacturing issues, electrical issues, lithographic issues, and circuitry. Exemplary EDA software products from Synopsys, Inc. of Mountain View, Calif. that can be used at this stage include the Hercules product.

Moreover, during resolution enhancement (1130), geometric manipulations of the layout are performed to improve manufacturability of the design. Exemplary EDA software products from Synopsys, Inc. of Mountain View, Calif. that can be used at this stage include: Proteus, Proteus, and PSMGED products.

Additionally, during mask-data preparation (1132), the 'tape-out' data for production of masks to produce finished integrated circuits is provided. Exemplary EDA software products from Synopsys, Inc. of Mountain View, Calif. that can be used at this stage include the Cats. family of products.

For all of the above mentioned integrated circuit design tools, similar tools from other EDA vendors, such as Cadence and Mentor Graphics can be used as an alternative. Additionally, similarly non-commercial tools available from universities can be used.

Embodiments of the present disclosure can be used during one or more of the above-described stages. Specifically, some embodiments of the present disclosure can be used in EDA software 1112.

A storage subsystem is preferably used to store the basic programming and data constructs that provide the functionality of some or all of the EDA tools described herein, and tools applied for development of cells for the library and for physical and logical design using the library. These software modules are generally executed by one or more processors in a manner known to those of ordinary skill in the art.

Hardware/Software Equivalence

Certain innovations, embodiments and/or examples described herein comprise and/or use a processor. As used herein, the term "processor" signifies a tangible information processing device that physically transforms information, for example, data. As defined herein, "data" signifies information that can be in the form of an electrical, magnetic, or optical signal that is capable of being stored, accessed, transferred, combined, compared, or otherwise manipulated by an information processing device.

The processor can be electronic, for example, comprising digital logic circuitry (for example, binary logic), or analog (for example, an operational amplifier). The processor can also be non-electronic, for example, as seen in processors based on optical signal processing, DNA transformations or quantum mechanics, or a combination of technologies, such as an optoelectronic processor. For information structured in binary form, any processor that can transform the information using the AND, OR and NOT logical operations (and their derivatives, such as the NAND, NOR, and XOR operations) can transform the information using any function of Boolean logic. A processor such as a neural network processor can also transform information non-digitally. There is no scientific evidence that any of these processors are processing, storing and retrieving information, in any manner or form equivalent to the bioelectric circuitry of the human brain.

As used herein, the term "module" signifies a tangible information processing device that typically is limited in size and/or complexity. For example, one or more methods or procedures in a computer program can be referred to as a module. A module can also refer to a small network of digital logic devices, in which the logic devices often may be interconnected to form a network. In many cases, methods and procedures in a computer program written in a specialized language, such as System C, can be used to generate a network of digital logic devices that process information with exactly the same results as are obtained from the methods and procedures.

A module can be permanently configured (e.g., hardwired to form hardware), temporarily configured (e.g., programmed with software), or a combination of the two configurations (for example, a structured ASIC). Permanently configured modules can be manufactured, for example, using Application Specific Integrated Circuits (ASICs) such as Arithmetic Logic Units (ALUs), Programmable Logic Arrays (PLAs), or Read Only Memories (ROMs), all of which are typically configured during manufacturing. Temporarily configured modules can be manufactured, for example, using Field Programmable Gate Arrays (FPGAs—for example, sold by Xilink or Altera), Random Access Memories (RAMS) or microprocessors. A module is configured to process information, typically using a sequence of operations to transform the information (or in the case of ROMs and RAMS, transforming information by using the input information as an address for memory that stores output information), to perform aspects of the present innovations, embodiments and/or examples of the invention.

Modules that are temporarily configured need not be configured at any one instance in time. For example, an information processor comprising one or more modules can have the modules configured at different times. The processor can comprise a set of one or more modules at one instance of time, and to comprise a different set of one or modules at a different instance of time. The decision to manufacture or implement a module in a permanently configured form, a temporarily configured form, or a combination of the two forms, may be driven by cost, time considerations, engineering constraints and/or specific design goals. The "substance" of a module's processing is independent of the form in which it is manufactured or implemented.

As used herein, the term "algorithm" signifies a sequence or set of operations or instructions that a module can use to transform information to achieve a result. A module can comprise one or more algorithms. As used herein, the term "computer" includes an information processor that can perform certain operations such as (but not limited to) the AND, OR and NOT logical operations, with the addition of memory (for example, memory based on flip-flops using the NOT-AND or NOT-OR operation). Such a digital computer is said to be Turing-complete or computationally universal. A computer, whether or not it is a digital computer, typically comprises many modules.

As used herein, the term "software" or "program" signifies one or more algorithms and data structures that configure an information processing device for use in the innovations, embodiments and examples described in this specification. Such devices configurable by software include one or more computers, for example, standalone, client or server computers, or one or more hardware modules, or systems of one or more such computers or modules. As used herein, the term "software application" signifies a set of instruction and data that configure the information processing device to achieve a specific result, for example, to perform word processing operations, or to encrypt a set of data.

As used herein, the term "programming language" signifies a grammar and syntax for specifying sets of instruction and data that comprise software. Programming languages include assembler instructions, instruction-set-architecture (ISA) instructions, machine instructions, machine dependent instructions, microcode, firmware instructions, state-setting data, or either source code or object code written in any combination of one or more higher level languages, such as conventional procedural programming languages, for example, the "C" programming language or similar programming languages (such as SystemC), or object oriented programming language such as Smalltalk, C++ or the like, and any future equivalent programming languages.

Software is entered into, equivalently, read into, one or memories of the computer or computer system from an information storage device. The computer typically has a device for reading storage media that is used to transport the software, or has an interface device that receives the software over a network.

Technology Specific General Computer Explanation

Figure 16B:
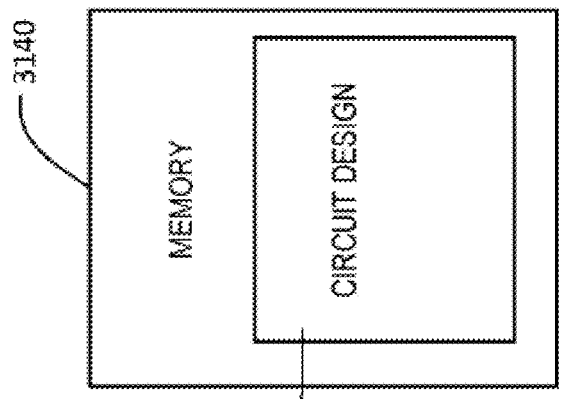
FIGS. 16A, 16B and 16C are simplified block diagrams of a computer system suitable for use with embodiments of the technology, as well as circuit design and circuit embodiments of the technology.
Figure 16C:
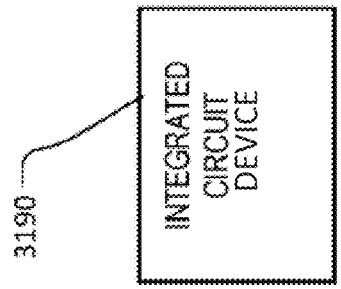
Figure 16A:
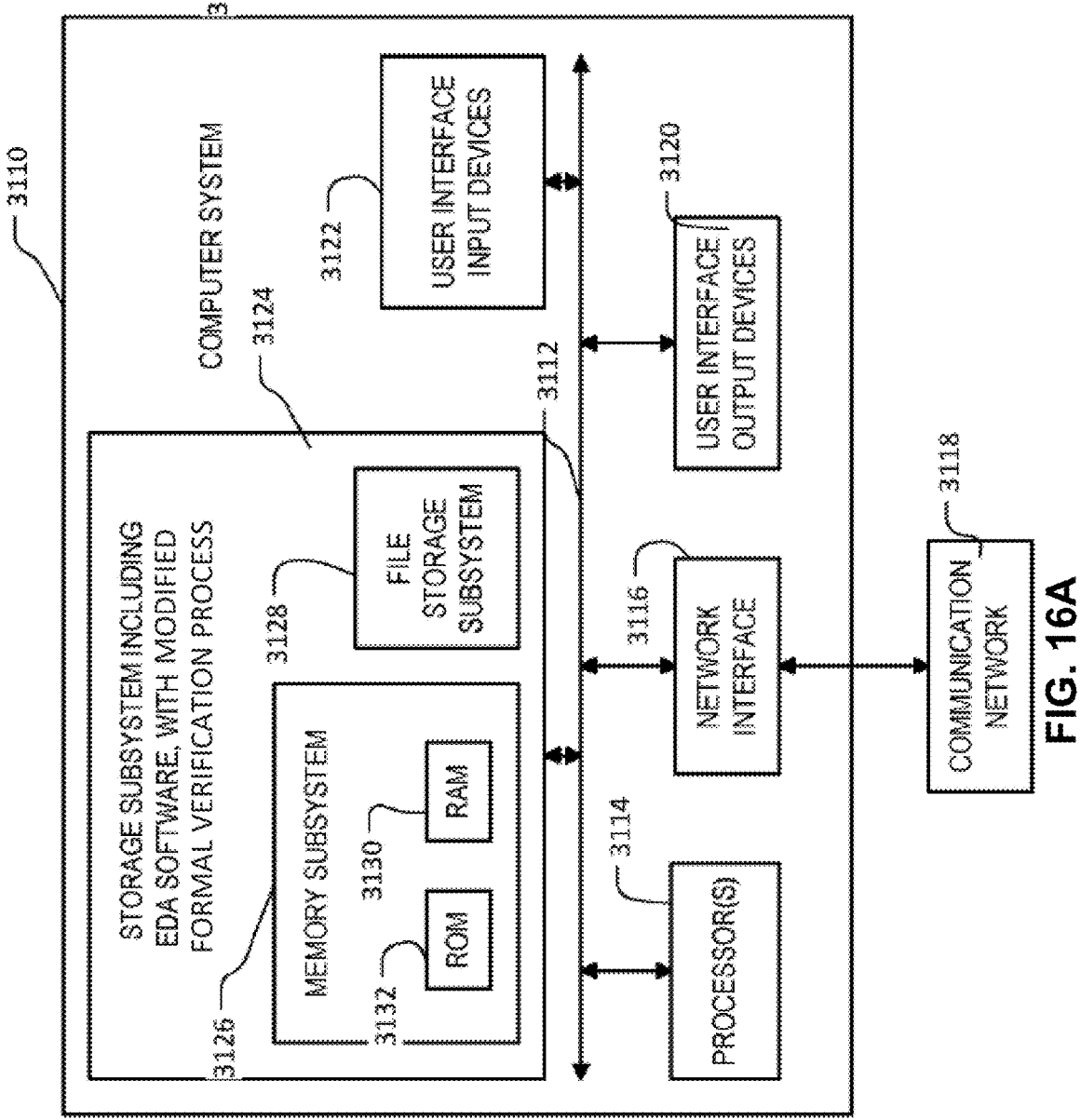

FIGS. 16A, 16B and 16C are simplified block diagrams of a computer system suitable for generating and verifying circuit designs using the modified verification process of the present invention. Computer system 3110 typically includes at least one computer or processor 3114 which communicates with a number of peripheral devices via bus subsystem 3112. These peripheral devices may include a storage subsystem 3124, comprising a memory subsystem 3126 and a file storage subsystem 3128, user interface input devices 3122, user interface output devices 3120, and a network interface subsystem 3116. The input and output devices allow user interaction with computer system 3110.

The computer system may be a server computer, a client computer, a workstation, a mainframe, a personal computer (PC), a tablet PC, a set-top box (STB), a personal digital assistant (PDA), a cellular telephone, a smartphone, a web appliance, a television, a network router, switch or bridge, or any data processing machine capable of executing instructions (sequential or otherwise) that specify actions to be taken by that machine. Innovations, embodiments and/or examples of the claimed inventions are neither limited to conventional computer applications nor the programmable apparatus that run them. To illustrate, the innovations, embodiments and/or examples of the claimed inventions can include an optical computer, quantum computer, analog computer, or the like. Aspects of the present invention are well suited to multi-processor or multi-core systems and may use or be implemented in distributed or remote systems. Processor here is used in the broadest sense to include singular processors and multi-core or multi-processor arrays, including graphic processing units, digital signal processors, digital processors and combinations of these elements. Further, while only a single computer system or a single machine may be illustrated, the use of a singular form of such terms shall also signify any collection of computer systems or machines that individually or jointly execute instructions to perform any one or more of the sets of instructions discussed herein. Due to the ever-changing nature of computers and networks, the description of computer system 3110 depicted in FIG. 16A is intended only as a specific example for purposes of illustrating the preferred embodiments. Many other configurations of computer system 3110 are possible having more or less components than the computer system depicted in FIG. 16A.

Network interface subsystem 3116 provides an interface to outside networks, including an interface to communication network 3118, and is coupled via communication network 3118 to corresponding interface devices in other computer systems or machines. Communication network 3118 may comprise many interconnected computer systems, machines and communication links. These communication links may be wireline links, optical links, wireless links, or any other devices for communication of information. Communication network 3118 can be any suitable computer network, for example the Internet.

User interface input devices 3122 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 3110 or onto communication network 3118. User interface output devices 3120 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide nonvisual display such as via audio output devices. In general, use of the term "output device" is intended to include all possible types of devices and ways to output information from computer system 3110 to the user or to another machine or computer system.

Memory subsystem 3126 typically includes a number of memories including a main random access memory (RAM) 3130 for storage of instructions and data during program execution and a read only memory (ROM) 3132 in which fixed instructions are stored. In one embodiment, RAM 3130 also serves to store the TCAD tool, along with the models, libraries and additional data files mentioned above. File storage subsystem 3128 provides persistent storage for program and data files, and may include a hard disk drive, a floppy disk drive along with associated removable media, a CD-ROM drive, an optical drive, or removable media cartridges. The databases and modules implementing the functionality of certain embodiments may be stored by file storage subsystem 3128. Bus subsystem 3112 provides a device for letting the various components and subsystems of computer system 3110 communicate with each other as intended. Although bus subsystem 3112 is shown schematically as a single bus, alternative embodiments of the bus subsystem may use multiple busses.

When configured to execute an EDA software tool including the modified formal verification process described herein, computer system 3110 depicted in FIG. 16A represents an electronic structure suitable for creating a circuit design. FIG. 16B shows a memory 3140 such as a non-transitory, computer readable data storage medium associated with file storage subsystem 3128, and/or with network interface subsystem 3116, and includes a data structure 3180 specifying a circuit design describing an integrated circuit. The memory 3140 can be a hard disk, a floppy disk, a CD-ROM, an optical medium, removable media cartridge, or other medium that stores computer readable data in a volatile or non-volatile form. Software read into a computer from such a memory can be converted at a selected instance in time from a tangible form to a transmission signal that is propagated through a medium (such as a network, connector, wire, or trace as an electrical pulse or a medium such as space or an atmosphere as electromagnetic radiation with wavelengths in the electromagnetic spectrum longer than infrared light). FIG. 16C is a block representing an IC 3190 designed and fabricated in accordance with the processes described above, where circuit 3190 is fabricated in accordance with the circuit design of data structure 3180 (see FIG. 16B).

The foregoing Detailed Description signifies in isolation individual features, structures or characteristics described herein and any combination of two or more such features, structures or characteristics, to the extent that such features, structures or characteristics or combinations thereof are based on the present specification as a whole in light of the knowledge of a person skilled in the art, irrespective of whether such features, structures or characteristics, or combinations thereof, solve any problems disclosed herein, and without limitation to the scope of the claims. When an embodiment of a claimed invention comprises a particular feature, structure, or characteristic, it is within the knowledge of a person skilled in the art to use such feature, structure, or characteristic in connection with other embodiments whether or not explicitly described.

In view of the foregoing Detailed Description it will be evident to a person skilled in the art that many variations may be made within the scope of innovations, embodiments and/or examples, such as function and arrangement of elements, described herein without departing from the principles described herein. One or more elements of an embodiment may be substituted for one or more elements in another embodiment, as will be apparent to those skilled in the art. The embodiments described herein were chosen and described to signify the principles of the invention and its useful application, thereby enabling others skilled in the art to understand how various embodiments and variations are suited to the particular uses signified.

The foregoing Detailed Description of innovations, embodiments, and/or examples of the claimed inventions has been provided for the purposes of illustration and description. It is not intended to be exhaustive nor to limit the claimed inventions to the precise forms described, but is to be accorded the widest scope consistent with the principles and features disclosed herein. Obviously, many variations will be recognized by a person skilled in this art. Without limitation, any and all equivalents described, signified or incorporated by reference in this patent application are specifically incorporated by reference into the description herein of the innovations, embodiments and/or examples. In addition, any and all variations described, signified or incorporated by reference herein with respect to any one embodiment are also to be considered taught with respect to all other embodiments. Any such variations include both currently known variations as well as future variations, for example any element used herein includes a future equivalent element that provides the same function, regardless of the structure of the future equivalent.

It is intended that the scope of the claimed inventions be defined and judged by the following claims and equivalents. The following claims are hereby incorporated into the Detailed Description, with each claim standing on its own as a separate embodiment. Disclosed embodiments can be described with more features than are expressly recited in the claims.

The invention claimed is:

1. A method for performing optical simulation of an image sensor design, the method being implemented on a computer and comprising:

generating a core three-dimensional (3D) single-pixel model based on a single-pixel layout file, said layout file including fabrication process details that operably describe a front-end portion of a single image sensor pixel of said image sensor design;

generating one or more modified single-pixel models by automatically modifying said core single-pixel 3D model in accordance with one or more modular templates such that each of said one or more modified single-pixel 3D models includes at least one optically-relevant structure design included in said one or more modular templates;

generating one or more simulation models including optical mesh information defining optical characteristics of at least a portion of said one or more modified single-pixel 3D models; and performing said optical simulation on said one or more simulation models.

2. The method of claim 1, wherein generating said single-pixel 3D model comprises utilizing one or more of process-emulation commands, defined masks, doping profile information and critical dimensions provided in said layout file.

3. The method of claim 2, wherein generating said single-pixel 3D model further comprises automatically assigning a name to each region and contact of the single-pixel 3D model using corresponding names provided in said layout file.

4. The method of claim 1, wherein automatically generating said one or more modified single-pixel 3D models comprises modifying said core single-pixel 3D model such that each of said one or more modified single-pixel 3D models includes at least one of a color filter layer, an anti-reflective layer and a micro-lens structure that is included in said one or more modular templates.

5. The method of claim 4, wherein automatically generating said one or more modified single-pixel 3D models further comprises modifying said core single-pixel 3D model such that each of said one or more modified single-pixel 3D models includes at least one back-end structure design that is included in said one or more modular templates.

6. The method of claim 5, wherein automatically generating said one or more modified single-pixel 3D models further comprises automatically arranging said core single-pixel 3D model, said at least one optically-relevant structure design and said at least one back-end structure design in at least one of a front-side illuminated (FSI) configuration and a back-side illuminated (BSI) configuration.

7. The method of claim 4, wherein generating said one or more simulation models comprises generating tensor mesh information for each structure of said one or more modified single-pixel 3D models.

8. The method of claim 4, further comprising generating a 3D array model by duplicating said modified single-pixel 3D model, and arranging said duplicated modified single-pixel 3D models in a predetermined array configuration determined by said one or more modular templates.

9. The method of claim 8, wherein generating said one or more simulation models comprises generating tensor mesh information for each structure of said 3D array model.

10. The method of claim 8, wherein generating said array model further comprises modifying a color filter layer of each of said duplicated modified single-pixel 3D models according to a color filter arrangement determined by a color filter template of said one or more modular templates.

11. The method of claim 8, wherein generating said array model further comprises automatically assigning an index-tagged name to each region of each said duplicated modified single-pixel 3D model such that each said name includes a row-column designation identifying a corresponding duplicated modified single-pixel 3D model in which said each region is disposed.

12. The method of claim 4, further comprising generating a single-pixel two-dimensional (2D) model including a cross-section portion of said at least one modified single-pixel 3D model.

13. The method of claim 12, wherein generating said one or more simulation models comprises generating tensor mesh information for each structure of said single-pixel 2D model.

14. The method of claim 12, further comprising generating a 2D array model by duplicating said single-pixel 2D model, and arranging said duplicated modified single-pixel 2D models in a predetermined array configuration determined by said one or more modular templates.

15. The method of claim 14, wherein generating said array model further comprises modifying a color filter layer of each of said duplicated modified single-pixel 2D models according to a color filter arrangement determined by said one or more modular templates.

16. The method of claim 14, wherein generating said one or more simulation models comprises generating tensor mesh information for each structure of said 2D array model.

17. The method of claim 1, wherein performing said optical simulation on said one or more simulation models comprises capturing a plurality of snapshots depicting instantaneous simulation results periodically generated by said one or more simulation models during the simulation process.

18. The method of claim 17,
wherein said plurality of snapshots correspond to simulation results generated by said one or more simulation models in response to a plurality of visible light frequencies, and
wherein said method further comprises displaying said plurality of snapshots as a plurality of curves, wherein each curve is generated using a color that corresponds with response of said one or more simulation models to a corresponding visible light frequency.

19. An apparatus, comprising: a processor; and a non-transitory computer-readable storage medium storing instructions that, when executed by the processor, cause the processor to perform a method for performing optical simulation of an image sensor design, the method being implemented on a computer and comprising:
generating a core three-dimensional (3D) single-pixel model based on a single-pixel layout file, said layout file including fabrication process details that operably describe a front-end portion of a single image sensor pixel of said image sensor design;
generating one or more modified single-pixel models by automatically modifying said core single-pixel 3D model in accordance with one or more modular templates such that each of said one or more modified single-pixel 3D models includes at least one optically-relevant structure design included in said one or more modular templates;
generating one or more simulation models including optical mesh information defining optical characteristics of at least a portion of said one or more modified single-pixel 3D models; and
performing said optical simulation on said one or more simulation models.

20. In an electronic design automation (EDA) tool in a computer, a Technology Computer-Aided Design (TCAD) software tool configured to perform optical simulation of an image sensor design, the TCAD software tool comprising:
a structure generation toolstep configured to generate a core three-dimensional (3D) single-pixel model based on a single-pixel layout file, said layout file including fabrication process details that operably describe a front-end portion of a single image sensor pixel of said image sensor design;
a prototyping toolstep configured to generate one or more modified single-pixel models by automatically modifying said core single-pixel 3D model in accordance with one or more modular templates such that each of said one or more modified single-pixel 3D models includes at least one optically-relevant structure design included in said one or more modular templates;
a mesh generation toolstep configured to generate one or more simulation models including optical mesh information defining optical characteristics of at least a portion of said one or more modified single-pixel 3D models; and
a simulation toolstep configured to perform said optical simulation on said one or more simulation models.

* * * * *